(12) United States Patent
Wilcox et al.

(10) Patent No.: US 11,530,072 B1
(45) Date of Patent: Dec. 20, 2022

(54) BOX CLOSURE DEVICE

(71) Applicant: Eco-Latch Systems, LLC, Pewaukee, WI (US)

(72) Inventors: Thomas Jon Wilcox, East Troy, WI (US); Jack David Wilson, Pewaukee, WI (US)

(73) Assignee: Eco-Latch Systems, LLC, Pewaukee, WI (US)

( * ) Notice: Subject to any disclaimer, the term of this patent is extended or adjusted under 35 U.S.C. 154(b) by 0 days.

(21) Appl. No.: 17/125,956

(22) Filed: Dec. 17, 2020

Related U.S. Application Data

(63) Continuation-in-part of application No. 16/813,636, filed on Mar. 9, 2020, now Pat. No. 11,267,608.

(60) Provisional application No. 62/975,653, filed on Feb. 12, 2020, provisional application No. 62/919,355, filed on Mar. 11, 2019.

(51) Int. Cl.
    *B65D 5/66* (2006.01)
    *F16B 5/06* (2006.01)
(52) U.S. Cl.
    CPC .......... *B65D 5/6611* (2013.01); *F16B 5/0635* (2013.01); *F16B 2005/0671* (2013.01)
(58) Field of Classification Search
    CPC .... B65D 45/00; B65D 5/4283; B65D 5/6673; B65D 5/6647; B65D 5/643; B65B 51/04

USPC .... 229/125.39, 125.41, 117.24, 125, 125.21, 229/125.23, 125.02; 292/288; 53/416; 24/563; 220/324, 770
See application file for complete search history.

(56) References Cited

U.S. PATENT DOCUMENTS

| | | | | |
|---|---|---|---|---|
| 3,221,977 A * | 12/1965 | Pollert | ................. | B65D 5/4604 229/117.23 |
| 3,545,801 A * | 12/1970 | Barsness | ............... | B65D 5/6611 292/288 |
| 7,284,688 B1 * | 10/2007 | Barsness | ................ | B65D 5/643 229/125.39 |
| 2001/0002678 A1 * | 6/2001 | Luby | .................... | B65D 5/6647 229/125 |
| 2020/0384658 A1 * | 12/2020 | Koizumi | ................... | B26B 3/08 |

* cited by examiner

*Primary Examiner* — Christopher R Demeree
(74) *Attorney, Agent, or Firm* — Brannen Law Office, LLC

(57) ABSTRACT

A box closure device having a first piece, a second piece, and a hub separating the first piece and second piece is provided. The first piece can have one or more engagement portions. The second piece can extend in both directions relative to the hub and is spaced from the first piece a selected amount allowing for box flaps to fit between the top piece and bottom piece. The second piece can have a blade to assist in positioning the closure device between the interior ends of two flaps. The second piece can also have a glide. In use, the user or a machine can engage the engagement portion(s) and twist the closure device so that the bottom piece is no longer aligned with a gap between the flaps thereby locking the flaps in a closed position. Lobes can be located on the ends of the second piece.

14 Claims, 34 Drawing Sheets

BOX CLOSURE DEVICE

This U.S. utility patent application (Continuation-In-Part) claims priority on and the benefit of nonprovisional application 16/813,636 filed Mar. 9, 2020, which claims priority on and the benefit of expired provisional application 62/919,355 filed Mar. 11, 2019, and also claims priority on and the benefit of provisional application 62/975,653 filed Feb. 12, 2020, the entire contents of each being hereby incorporated herein by reference.

BACKGROUND OF THE INVENTION

1. Field of the Invention

The present invention relates to a box closure device, and in particular to a box closure device that can be twisted to lock box flaps in a closed position.

2. Description of the Related Art

Several methods of closing or sealing a box exist.

In one method, the corners of successive flaps are tucked under one another. While this may be a simple solution, it does not offer an effective seal and is subject to the limits of the box flap stiffness and integrity which can degrade over time and in particular when a corner is bent.

In another method, tape is used to seal the box. While this can be an effective sealing method, the tape is only a single-use product and its removal can lead to damage to the box.

In a further method, a device can be used to fasten or close the box. Several such devices exist.

None of the known devices have the unique advantages of the present invention. Thus, there exists a need for a box closure device with improved characteristics that solves these and other problems.

SUMMARY OF THE INVENTION

A box closure device having a first piece, a second piece, and a hub separating the first piece and second piece is provided. The first piece can have one or more engagement portions. The second piece can extend in both directions relative to the hub and is spaced from the first piece a selected amount allowing for box flaps to fit between the top piece and bottom piece. The second piece can have a blade to assist in positioning the closure device between the interior ends of two flaps. The second piece can also have a glide. In use, the user or a machine can engage the engagement portion(s) and twist the closure device so that the bottom piece is no longer aligned with a gap between the flaps thereby locking the flaps in a closed position. Lobes can be located on the ends of the second piece.

According to one advantage of the present invention, a second piece can have lower chamfers that together form a blade that aids in inserting the closure device between a gap between outer flaps of a box.

According to another advantage of the present invention, a second piece can have upper chamfers that together form a glide that aids in allowing the closure device to twist thereby positioning the outer flaps of a box between the first piece and second piece of the closure device.

According to a further advantage of the present invention, the first piece can have a top surface that is a low-profile top surface. This prevents the closure device from interfering with the ability to stack closed and locked boxes.

According to a still further advantage of the present invention, the first piece has at least one engagement portion. The engagement portion can be formed with one or more ribs that can be selectably engaged by either a user or a tool. In another embodiment, the engagement portion can be at least one inwardly formed radial notch.

According to a still further advantage of the present invention, the closure device can be molded, assembled or otherwise formed.

According to a still further advantage of the present invention, sleeves may be provided and are insertable onto sections of the second piece. The sleeves can have selected thicknesses whereby a given sleeve thickness can be chosen so there is a desired distance between the first piece and the outer perimeter of the sleeve.

According to a still further advantage of the present invention, the sleeves can be pliable whereby they conform to the outer dimensions of the second piece. This advantageously allows for some of the benefits of the second piece profile to be retained.

According to a still further advantage of the present invention, the sleeves can be made of a high friction material to enhance grip and to minimize risk of inadvertent rotation of the closure device resulting in unlocking.

According to a still further advantage of the present invention, the lock status is known even though the second piece is not directly observable by the user when inserted between the flaps.

According to a still further advantage of the present invention, a tamper evident device can be provided. In such an embodiment, the top surface can be round and the tamper evident deice can be an arc that is located adjacent to the outer perimeter of the top surface. A seal can be affixed to both the tamper evident device and the closure device, wherein the seal breaks if the closure device is unlocked.

According to an advantage of a preferred embodiment of the present invention, the first piece can have arms that pivot up to form handles. The handles are useful for locking and unlocking the device (by twisting the device). It is contemplated that the handles could also be used to lift a locked box.

According to a further advantage of the present invention, the handles can lay flat about the perimeter of the first piece (in plane with the stationary surface) when not in use. This advantageously provides a low-profile device.

According to a still further advantage of the present invention, each arm can have an engagement portion (can be a cut-away section) that allows the user to engage the arms to move them from stored flat positions to upright positions.

According to a still further advantage of the present invention, in some embodiments the perimeter of the first piece is angled. In this regard, when in position to lock a box in a closed position, the angled perimeter allows an item that may come into contact with the closure device to slide over the closure device instead of dislodging the closure device.

According to a still further advantage of the present invention, an embodiment has a top engagement potion with fins that radially ran out from a center point. The fins can be radiused, which would allow an item that may come into contact with the closure device to slide over the closure device instead of dislodging the closure device.

According to an advantage of an embodiment of the present invention, the second piece (lower piece) has lobes on its distal ends wherein the shape of the second piece resembles a dog bone. The lobes have enlarged areas for engaging the box flaps to reduce pressure on the flaps.

According to another advantage of the present invention, the second piece can have an upper bevel, crowning in the center along the second piece longitudinal axis, allowing for the second piece to engage the flaps when the closure is being moved to the locked position.

According to a further advantage of the present invention, the second piece can have a lower bevel to aid in allowing the closure to pass between two flaps. The lower bevel has two opposed faces forming a blade that are concave as the rate of distance between the faces increases with distance from the bottom of the blade.

According to a further advantage of the present invention, the second piece can be angled slightly wherein the space between the second piece and first piece is greatest at the hub and smallest at the lobes.

According to a still further advantage yet of the present invention, the second piece has a profile along its longitudinal axis that is tallest at the hub and shortest at the second piece distal ends. This allows the second piece to be more flexible at the distal ends and to have increased strength at the center.

Other advantages, benefits, and features of the present invention will become apparent to those skilled in the art upon reading the detailed description of the invention and studying the drawings.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 46:
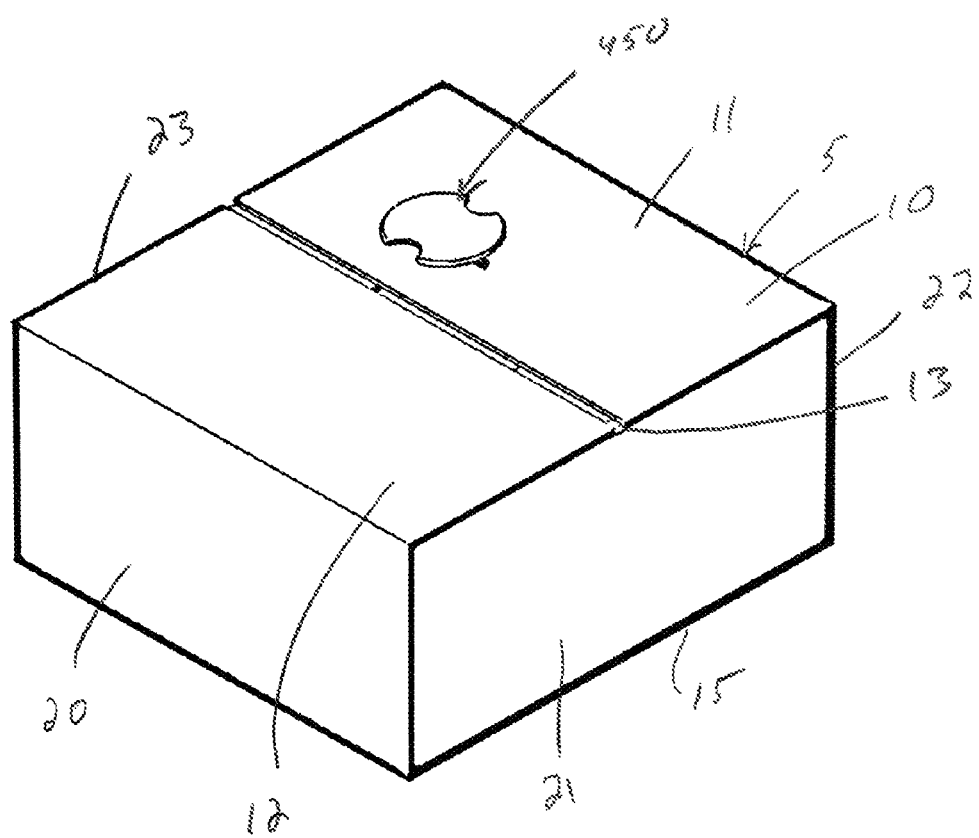
FIG. 46 is an upper perspective view showing the closure device illustrated in FIG. 43 aligned with a gap.

The embodiments of the present invention are useful to secure a box 5 in a closed position. An exemplary box 5 is illustrated in FIG. 46. The box 5 has a top 10 with outer flaps 11 and 12, respectively. The outer flaps 11 and 12 are sometimes referred to as major flaps. The box 5 also has inner flaps that are sometimes referred to as minor flaps. In a closed position, the major flaps 11 and 12 are flat at the top 10 of the box and lie in planes parallel to each other. When closed, a gap 13 can be between the major flaps 11 and 12. A bottom 15 is also provided and is similar in structure to the box top 10. The box 5 further has sides 20, 21, 22 and 23 respectively. It is appreciated that the boxes for use with the present invention can be made of various materials (such as card board, plastic, or otherwise) and that the thicknesses of the parts (in particular, the flaps) of the box can vary without departing from the broad aspects of the present invention.

Turning now to FIGS. 1-6, it is seen that a preferred embodiment of the present invention is illustrated. A closure device 50 has a top 51 and a bottom 52. Device 50 has a first piece 60, a second piece 90 and a hub 80 that interconnects the first and second pieces 60 and 90, respectively. The device 50 can be made of any suitable material such as, but not limited to, plastic or metal. Plastic parts can be made by any suitable method, including but not being limited to molding or 3D printing.

The first piece 60 has a top surface 61 and a bottom surface 62. The first piece 60 has a perimeter 63. The perimeter 63 is preferably circular in shape. However, it is appreciated that perimeter 63 could have different shapes without departing from the broad aspects of the present invention. There are two engagement portions 70 and 75, respectfully, that are provided on the first piece 60. There could be more or fewer engagement portions without departing from the broad aspects of the present invention. Each engagement portion preferably has at least one slot formed into the top surface 61. There are preferably multiple slots which form ribs there between. The two engagement portions 70 and 75 are located on opposite sides of the first piece.

The hub 80 has a first end 81 and a second end 82.

The second piece 90 has a top 91, a bottom 92, a first side 93, a second side 94, a first end 95 and a second end 96. The second piece 90 has upper chamfers 100 on the upper edges of sides 93 and 94 which together form a glide 101. The second piece also has lower chamfers 105 on the bottom edges of sides 93 and 94 which together form a blade 106. Blade 106 preferably has an edge where the two chamfers meet. The hub 80 contacts the second piece 90 generally equidistant between ends 95 and 96, respectively, thereby bisecting the second piece 90 into a first section 110 and a second section 120. The first section 110 and second section 120 are preferably equal in length. The first piece 60, hub 80 and second piece 90 are preferably stationary with respect to each other.

Figure 1:
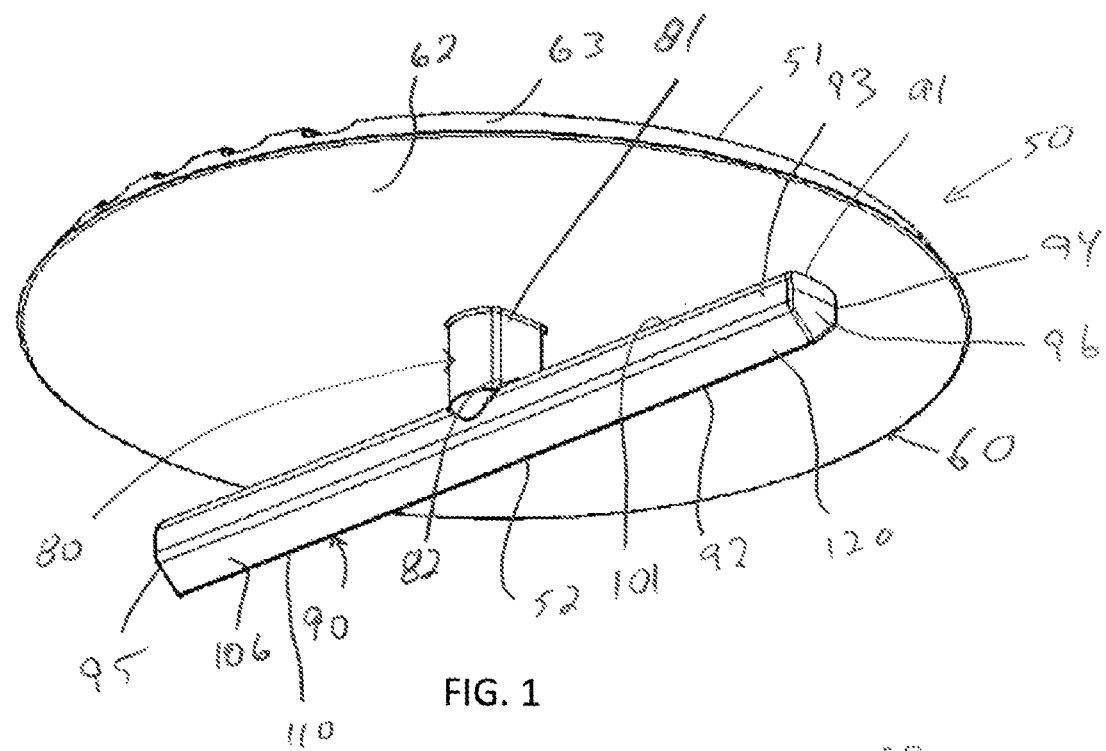
FIG. 1 is a lower perspective view of a preferred embodiment of the present invention.
Figure 2:
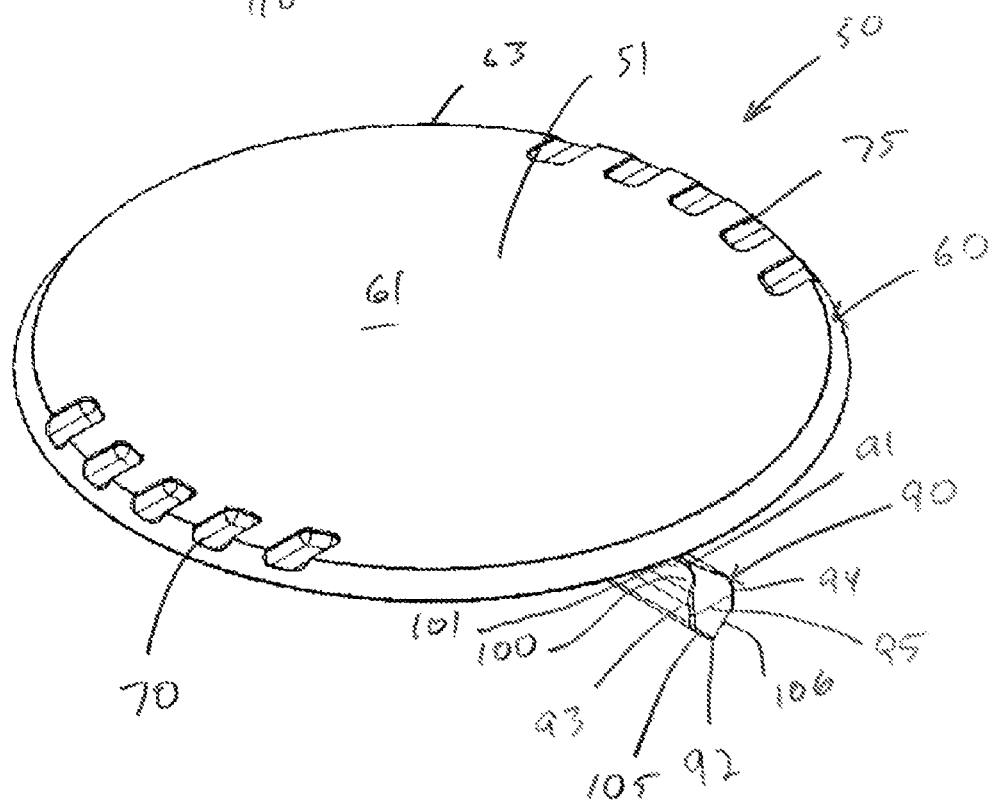
FIG. 2 is an upper perspective view of the embodiment illustrated in FIG. 1.
Figure 3:
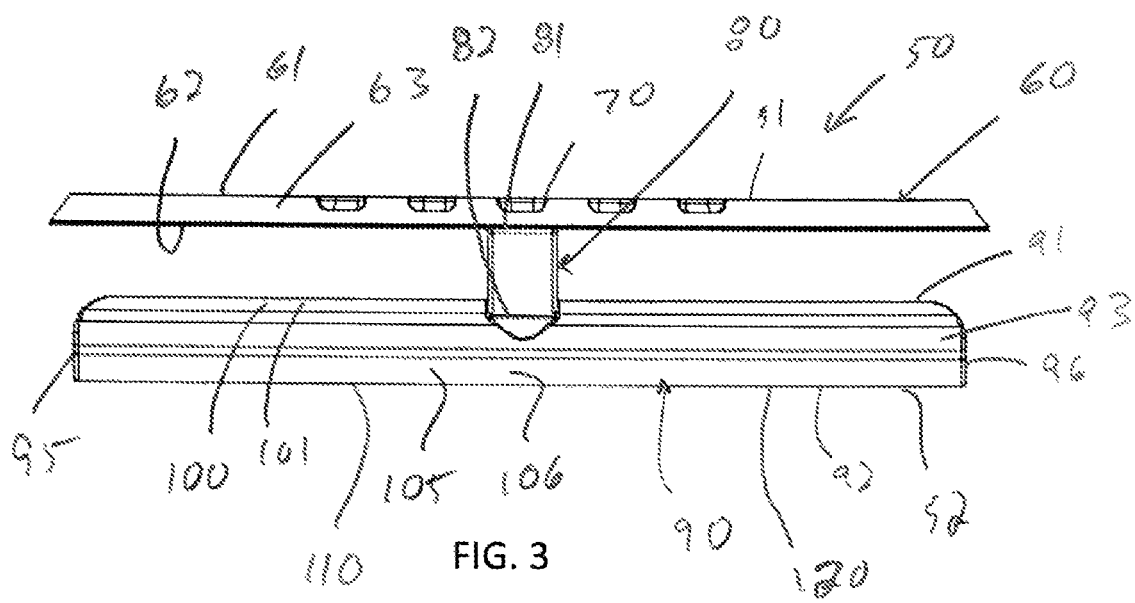
FIG. 3 is a side view of the embodiment illustrated in FIG. 1.
Figure 4:
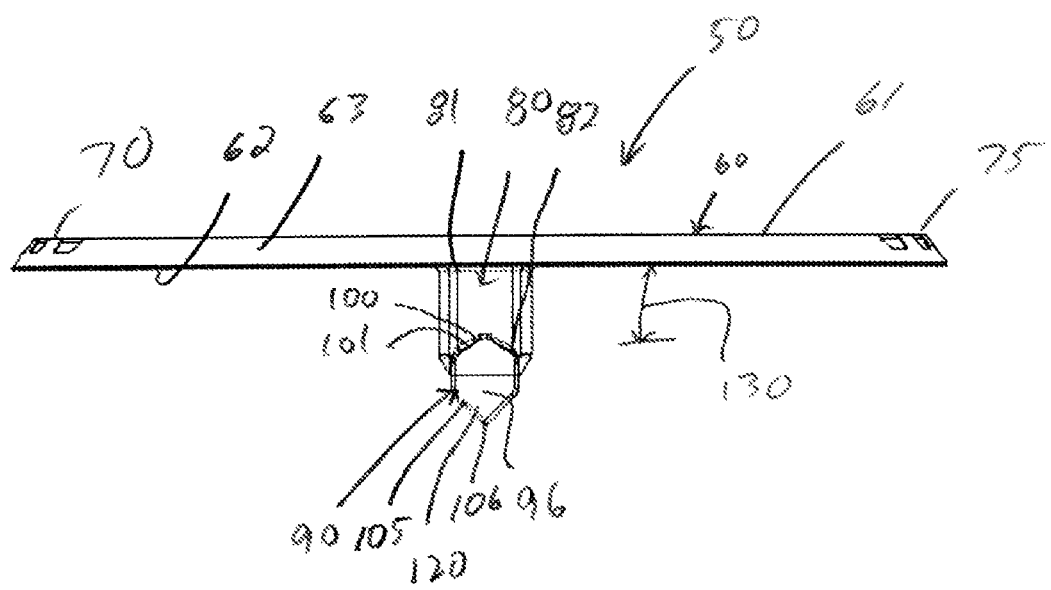
FIG. 4 is an end view of the embodiment illustrated in FIG. 1.
Figure 5:
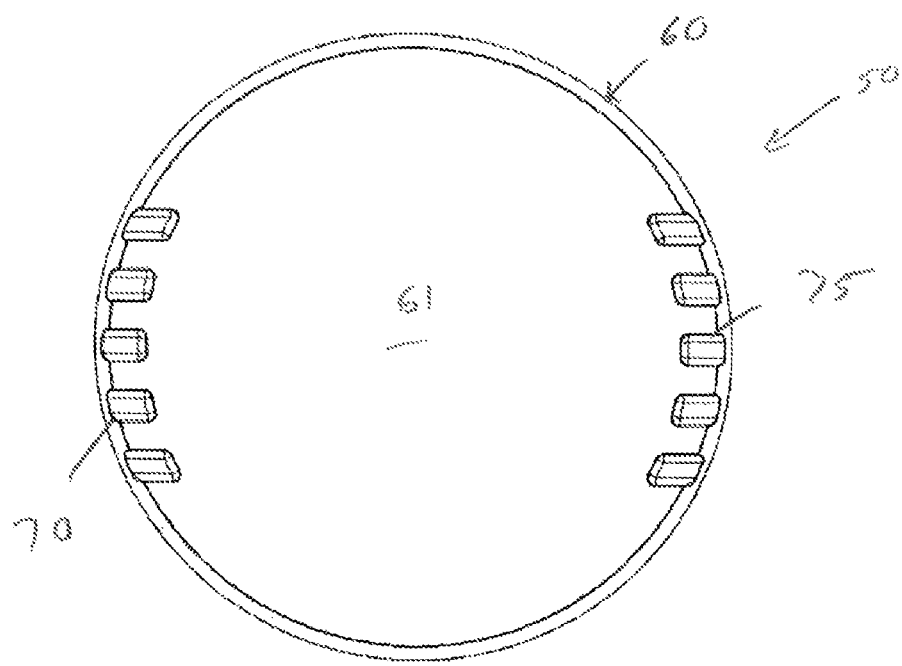
FIG. 5 is a top view of the embodiment illustrated in FIG. 1.
Figure 6:
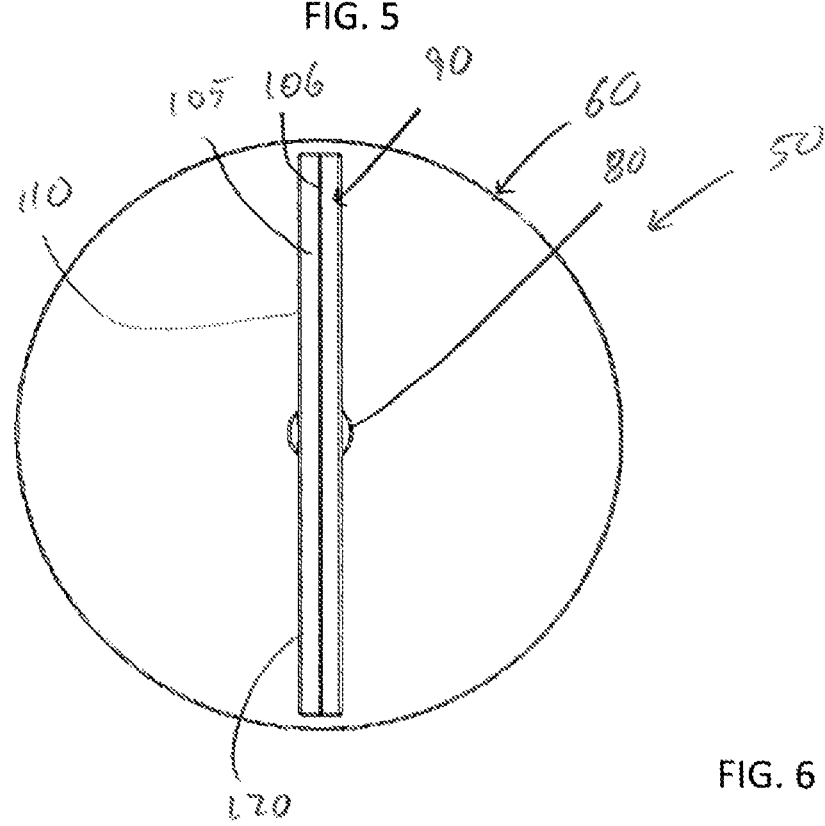
FIG. 6 is a bottom view of the embodiment illustrated in FIG. 1.
Figure 7:
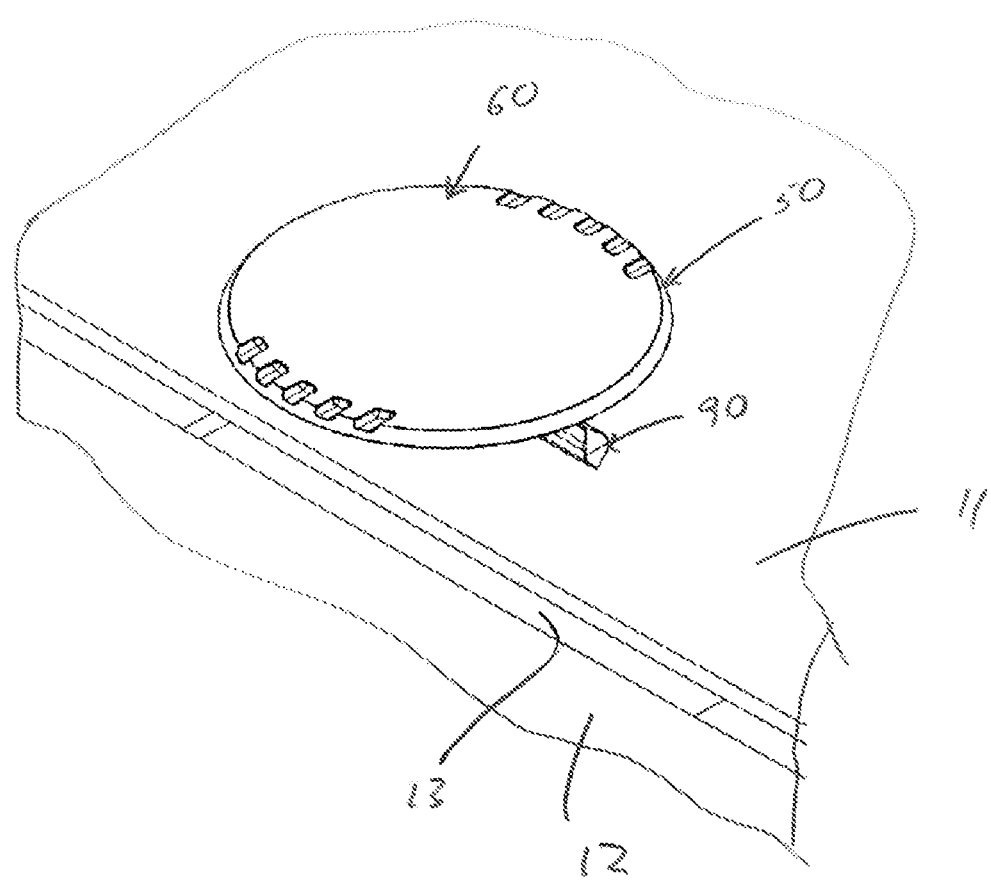
FIG. 7 is an upper perspective view of the embodiment illustrated in FIG. 1 being aligned with a gap.
Figure 8:
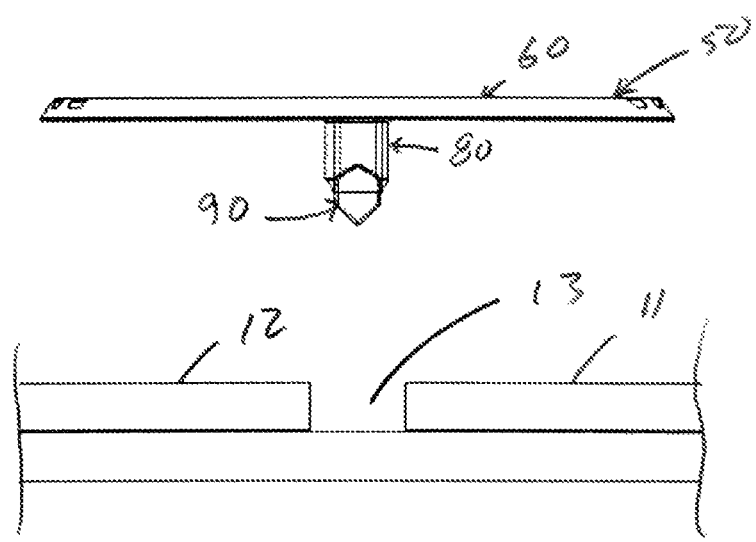
FIG. 8 is an end view of the embodiment illustrated in FIG. 1 being aligned with a gap.
Figure 9:
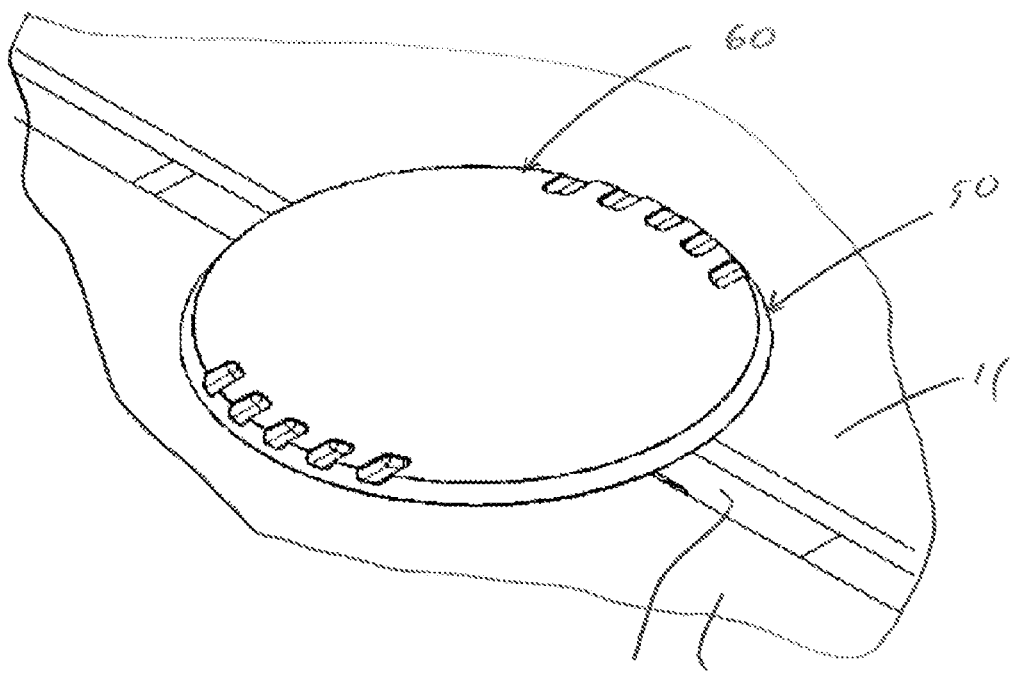
FIG. 9 is an upper perspective view showing the embodiment illustrated in FIG. 1 inserted through the gap.
Figure 10:
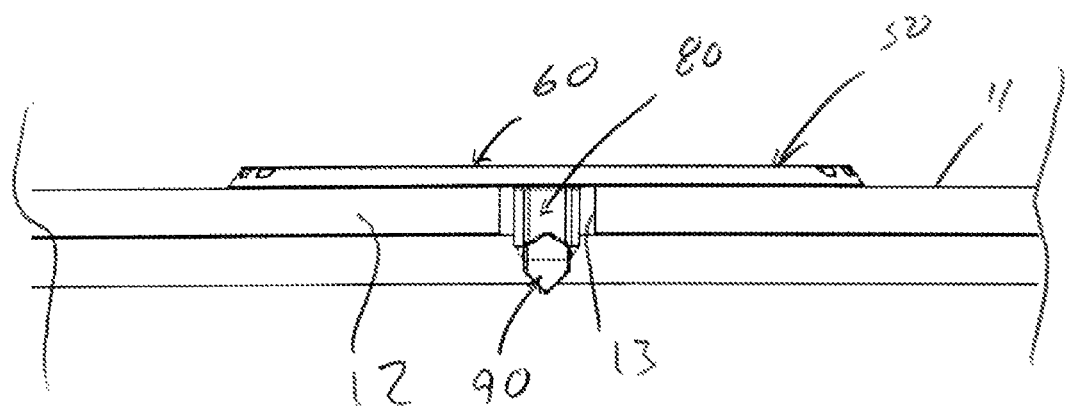
FIG. 10 is an end view showing the embodiment illustrated in FIG. 1 inserted through the gap.
Figure 11:
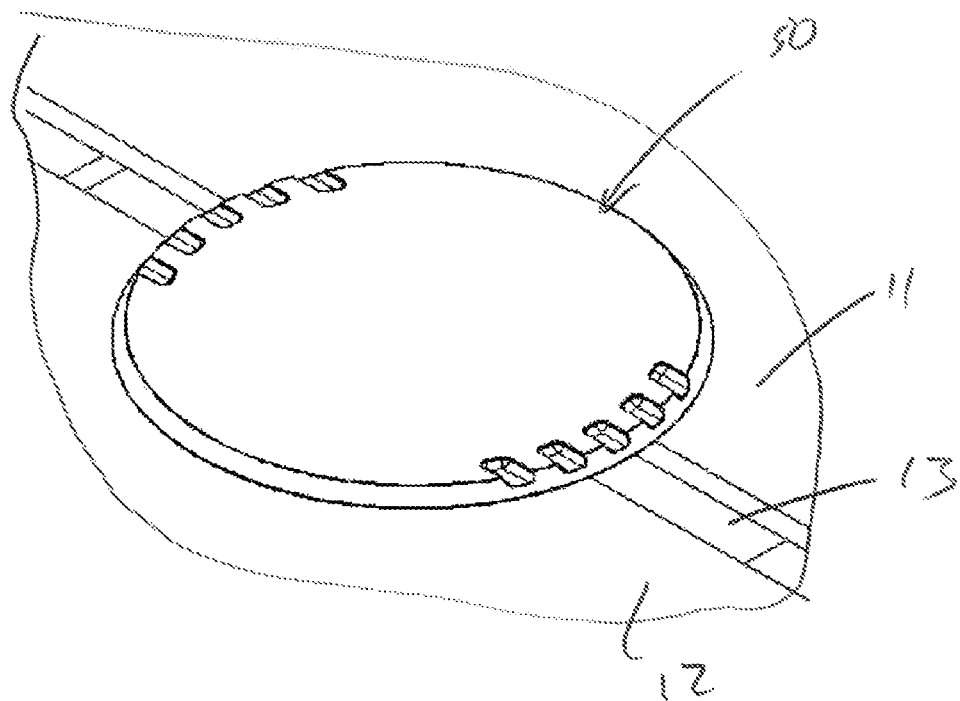
FIG. 11 is an upper perspective view showing the embodiment illustrated in FIG. 1 locking flaps in a closed position.
Figure 12:
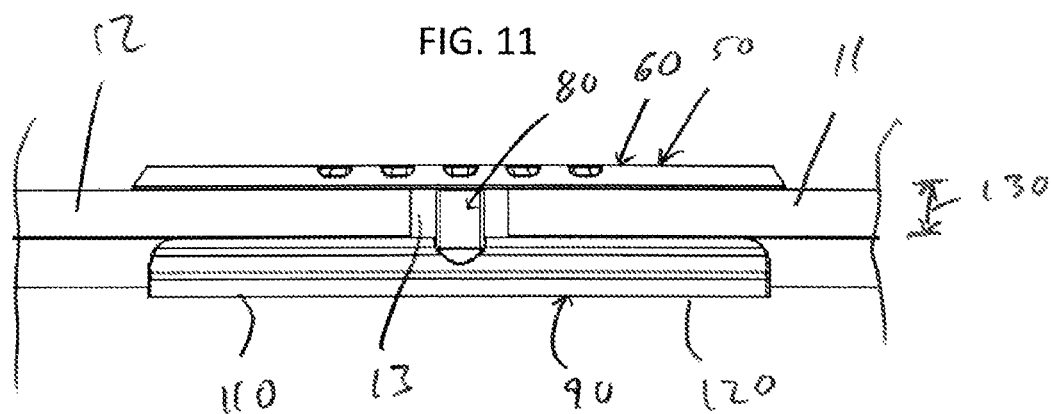
FIG. 12 is a side view showing the embodiment illustrated in FIG. 1 locking the flaps in a closed position.
Figure 13:
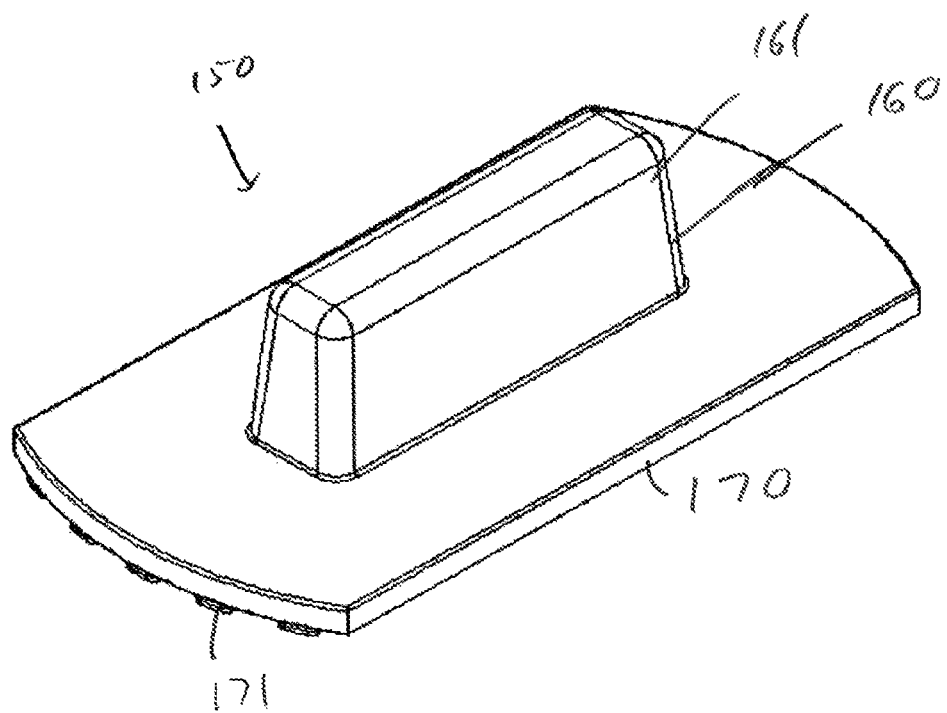
FIG. 13 is an upper perspective view of a tool useful to rotate the box closure device.
Figure 14:
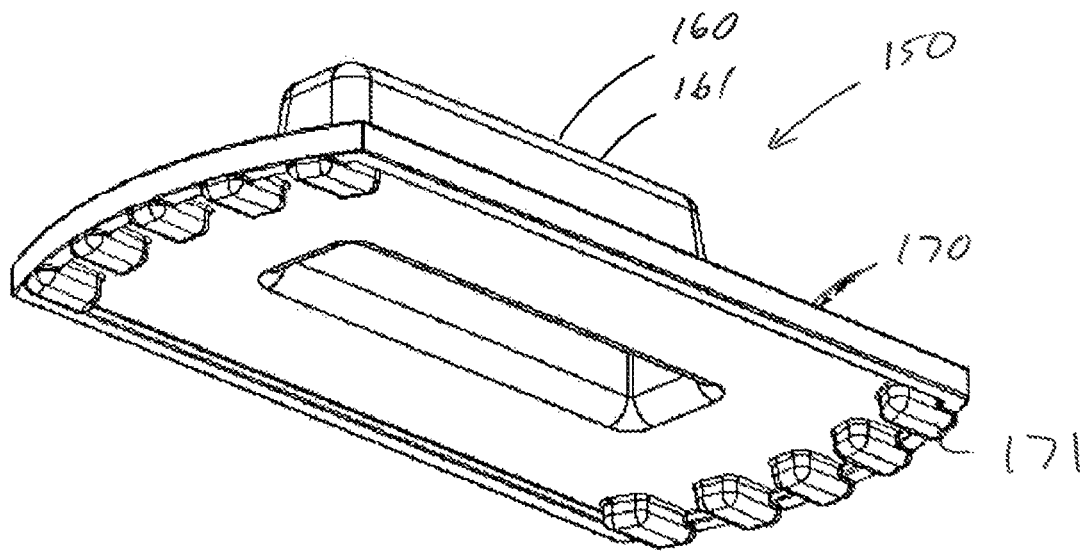
FIG. 14 is a lower perspective view of the tool illustrated in FIG. 13.
Figure 15:
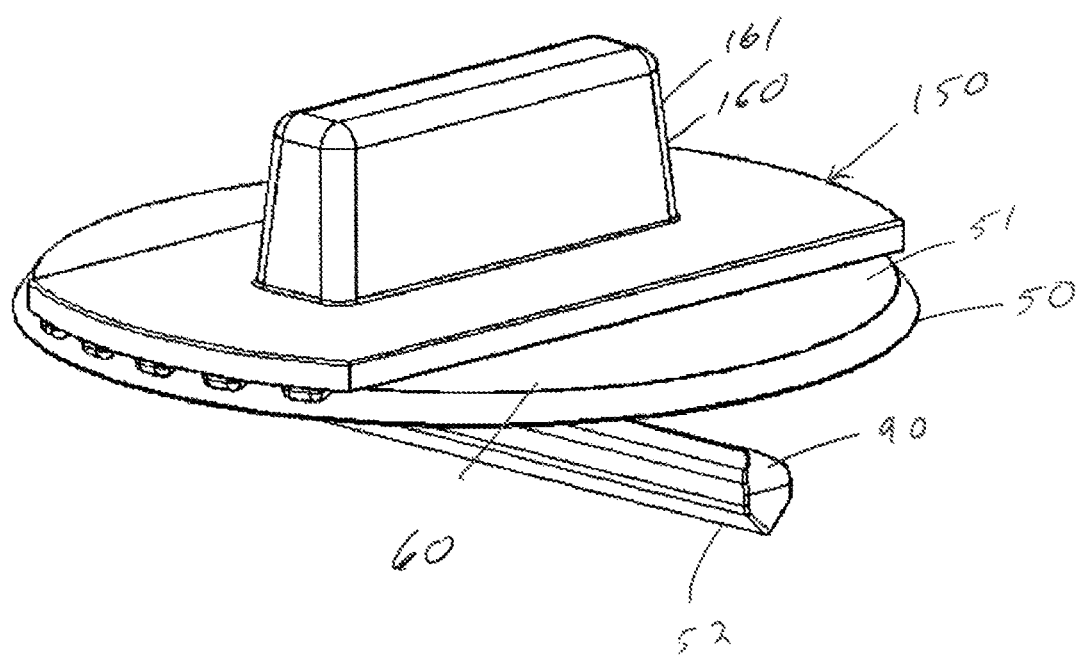
FIG. 15 is an upper perspective view showing a tool in mating engagement with a box closure device.

Use of the present invention is illustrated in FIGS. 7-12. Looking at FIGS. 7 and 8, it is seen that the second piece 90 can be aligned with the gap 13 between flaps 11 and 12. It is appreciated that the gap 13 can be wider or narrower in a given box. The blade 106 allows the second piece to penetrate the gap 13 even separating the flaps 11 and 12 when necessary if they are touching of if the gap 13 is narrower than the second piece. The second piece 90 is shown inserted through the gap in FIGS. 9 and 10. It is appreciated that the space 130 between the top 91 of the second piece 90 and the bottom surface 62 of the first piece 60 is similar to the thickness of flaps 11 and 12. The glide 101, formed of upper chamfers 100, directs the flaps 11 and 12 to be received between the top piece 60 and bottom piece 90 when the closure device 50 is twisted to the locked position. The locked position is illustrated in FIGS. 11 and 12. The glide is useful for both clockwise and counterclockwise twisting of the device 50, and is effective if the flaps are bent, damaged or even slightly thicker than the space 130 between the first piece 60 and second piece 90.

The device 50 locks the flaps 11 and 12 in the closed position when the flaps 11 and 12 are between the top piece 60 and bottom piece 90. It is appreciated that the engagement portions 70 and 75 can lie on an engagement axis, and that the engagement axis can be perpendicular to a second piece longitudinal axis. It is appreciated that other axis relationships could be used without departing from the broad aspects of the present invention. However, with the preferred arrangement, a user is certain that the flaps 11 and 12 are locked when the first piece 60 is flush against the flaps 11 and 12, and the engagement portions 70 and 75 are aligned with the gap 13. It is appreciated that the lock status is observable even though the second piece is not directly observable by the user when inserted between the flaps 11 and 12.

The engagement portions 70 can be gripped either by hand or with a tool. One suitable tool 150 is illustrated in FIGS. 13-16. The tool 150 has a top 160 with a handle 161 and a bottom 170 with grips 171. There are preferably two grips 171 on opposite ends of the bottom 170 which can engage the slots of the engagement portions 70 and 75 of the first piece 60 of the closure device 50. Twisting of the handle 161 will cause the device 50 to likewise twist.

Figure 16:
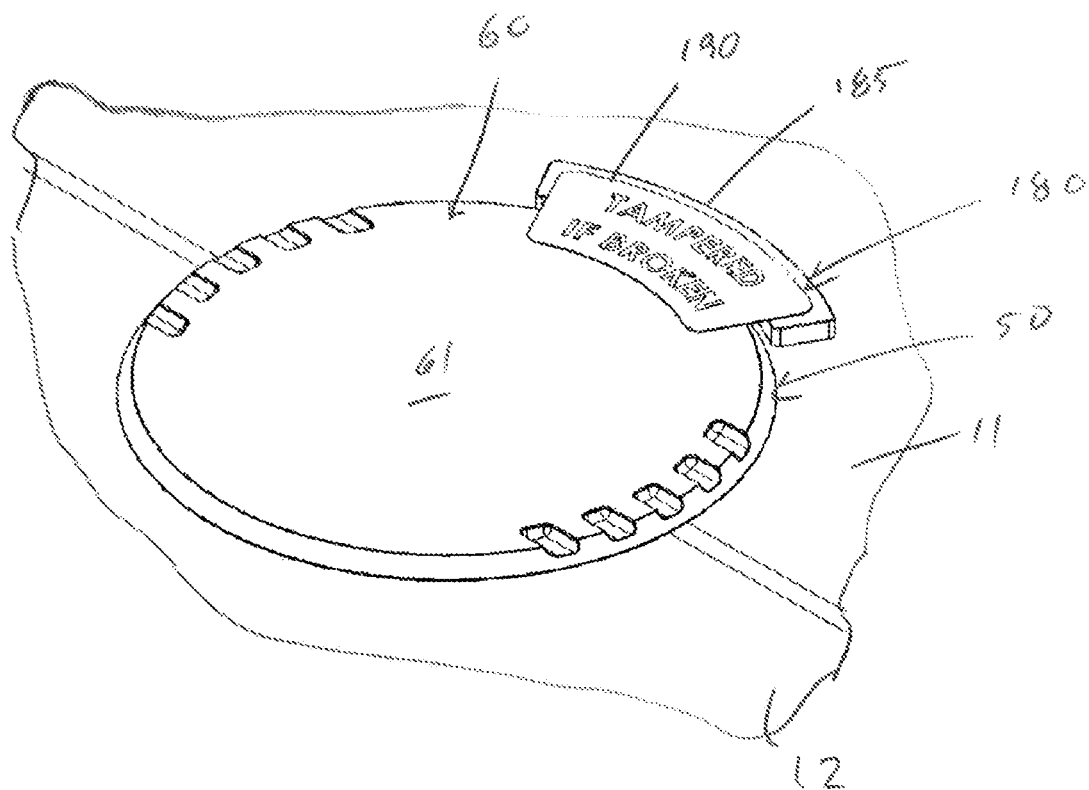
FIG. 16 is an upper perspective view showing an embodiment of a tamper evident device.
Figure 17:
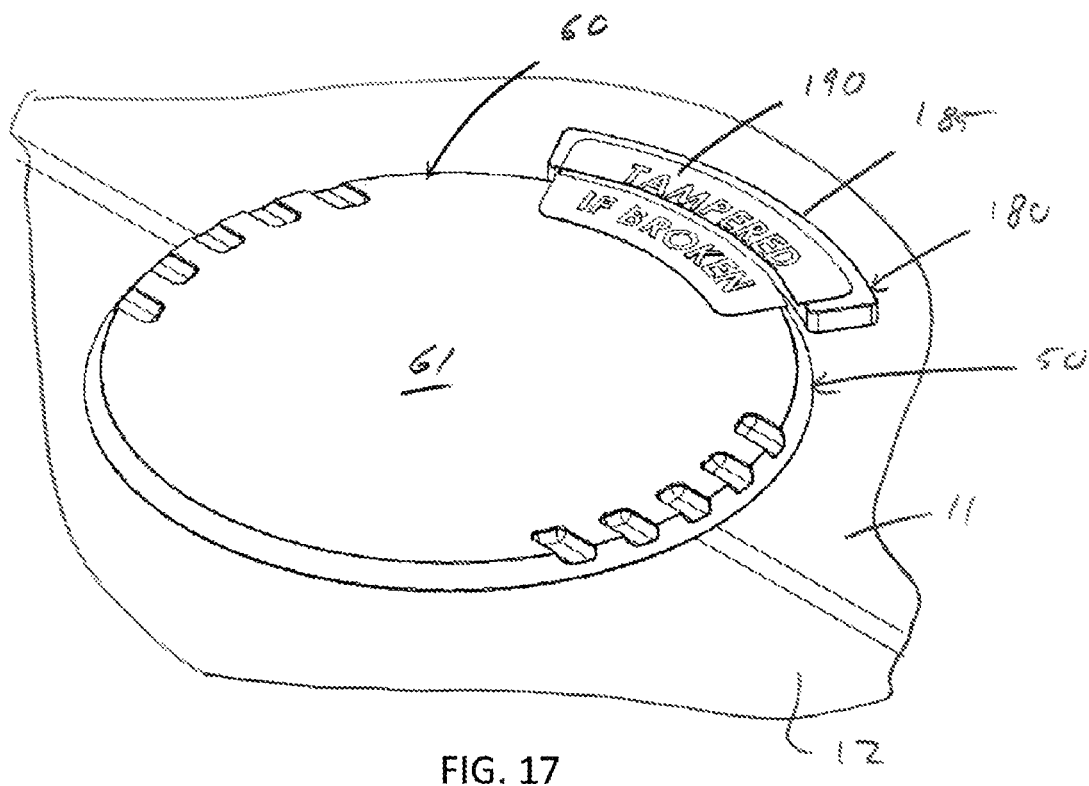
FIG. 17 is similar to FIG. 16 but shows a seal broken to indicate tampering of the closure device.
Figure 18:
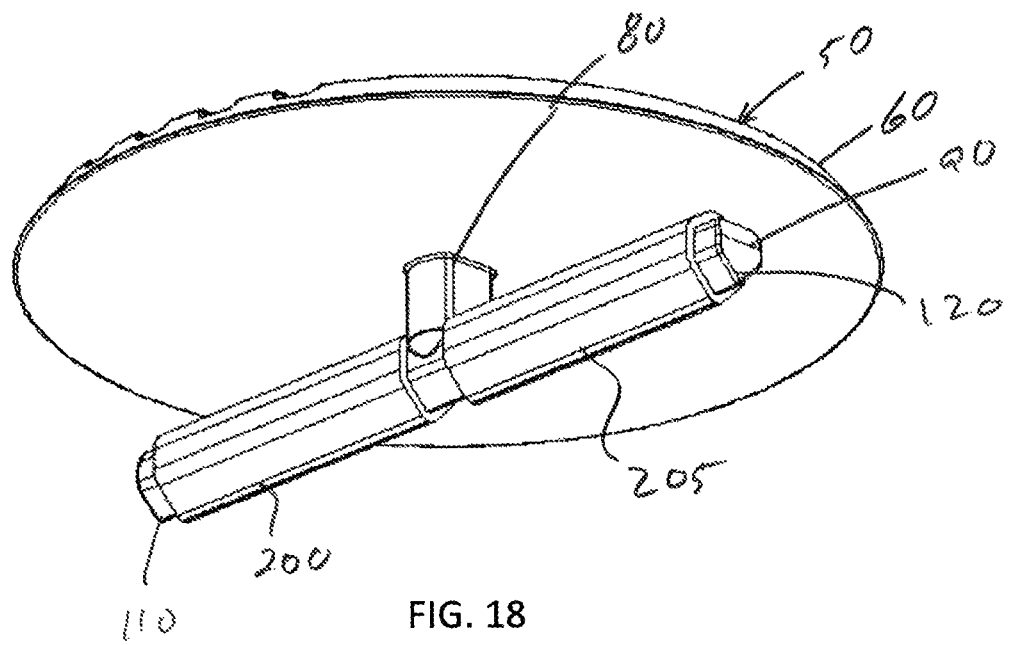
FIG. 18 is a lower perspective view of an alternative embodiment of the present invention including the closure device illustrated in FIG. 1 and sleeves.
Figure 19:
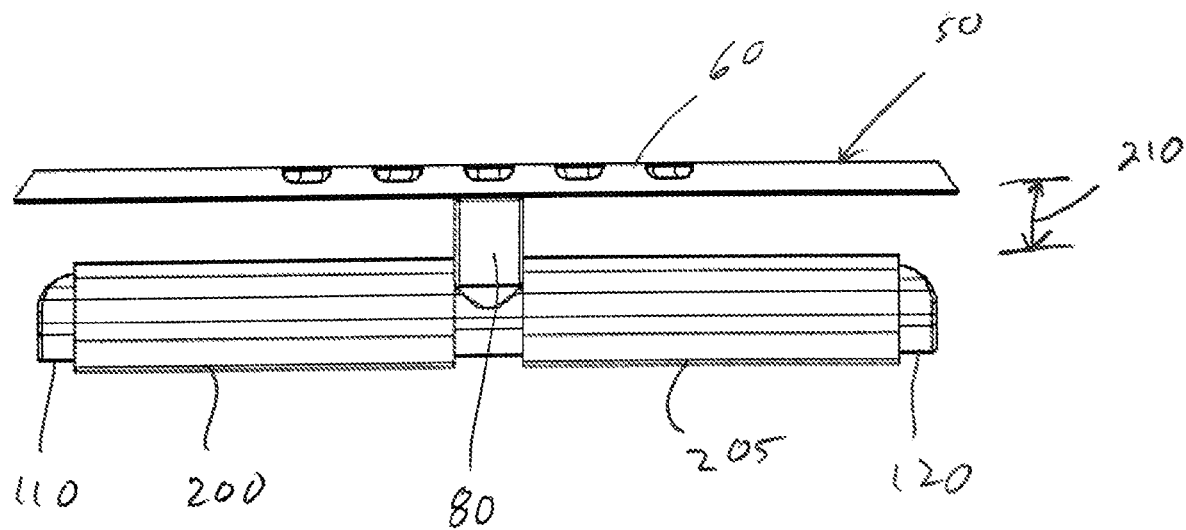
FIG. 19 is a side view of the embodiment illustrated in FIG. 18.
Figure 20:
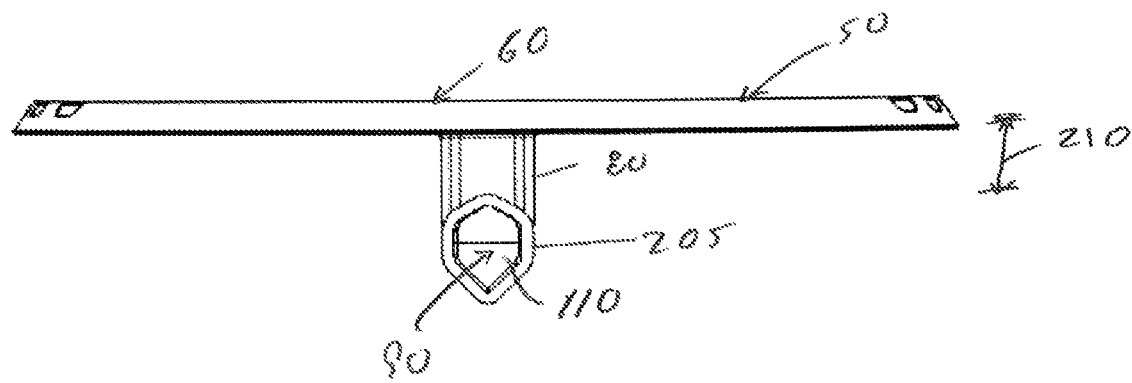
FIG. 20 is an end view of the embodiment illustrated in FIG. 18.
Figure 21:
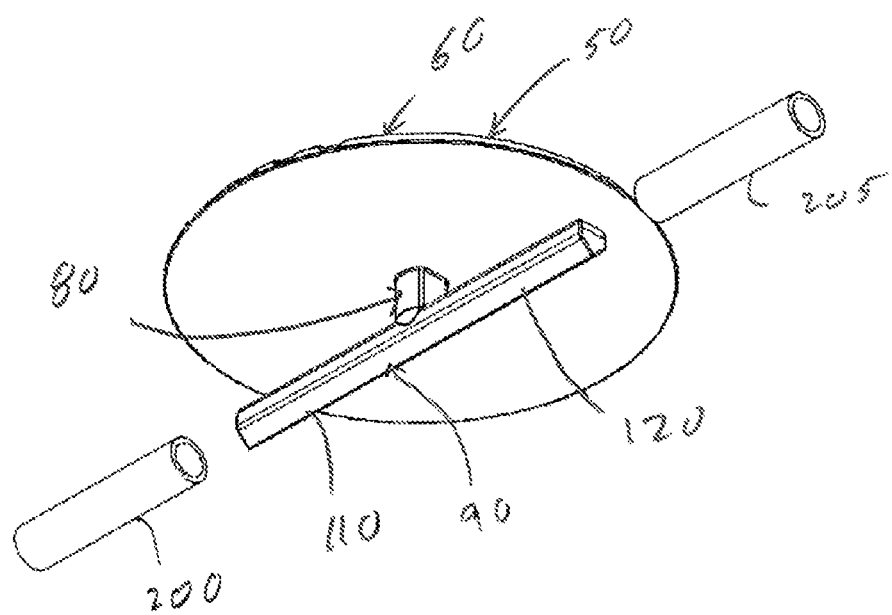
FIG. 21 is a lower perspective exploded view of the embodiment illustrated in FIG. 18.
Figure 22:
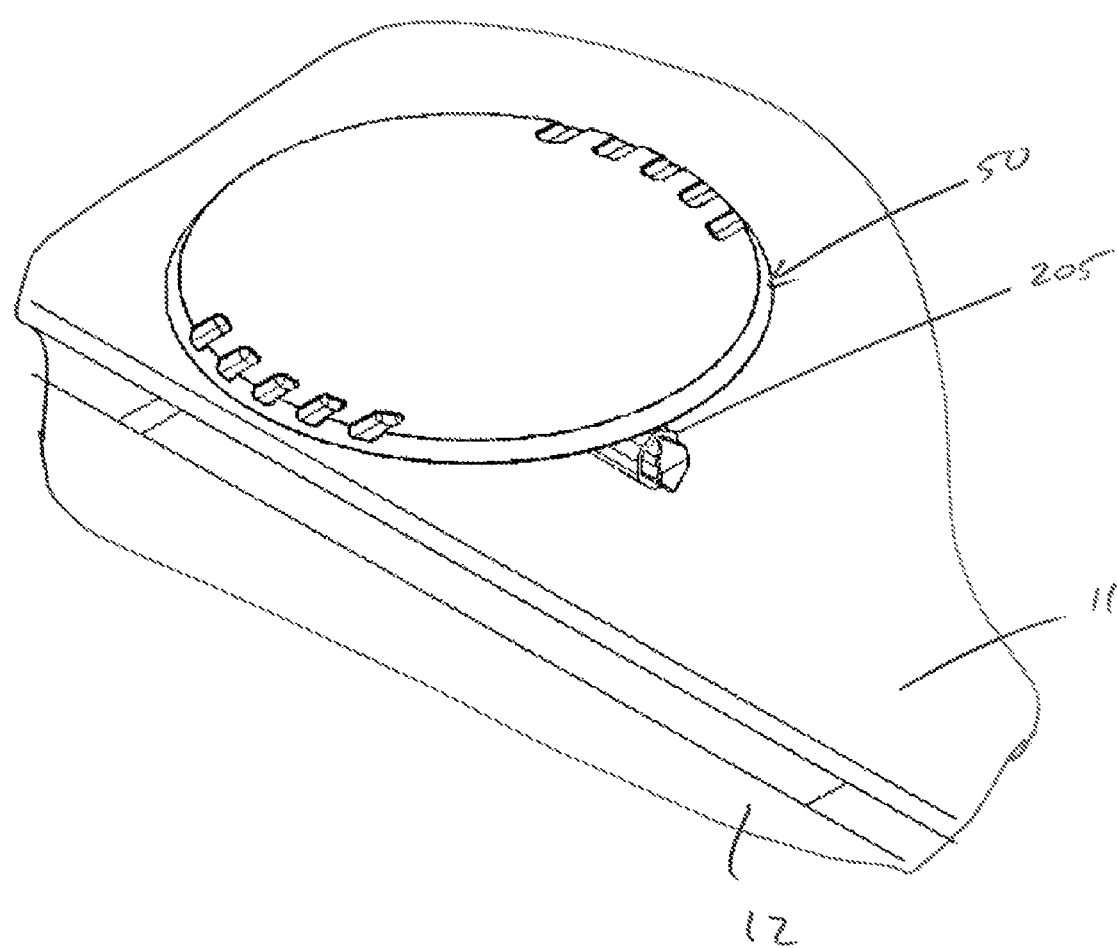
FIG. 22 is an upper perspective view of the embodiment illustrated in FIG. 18 being aligned with a gap.
Figure 23:
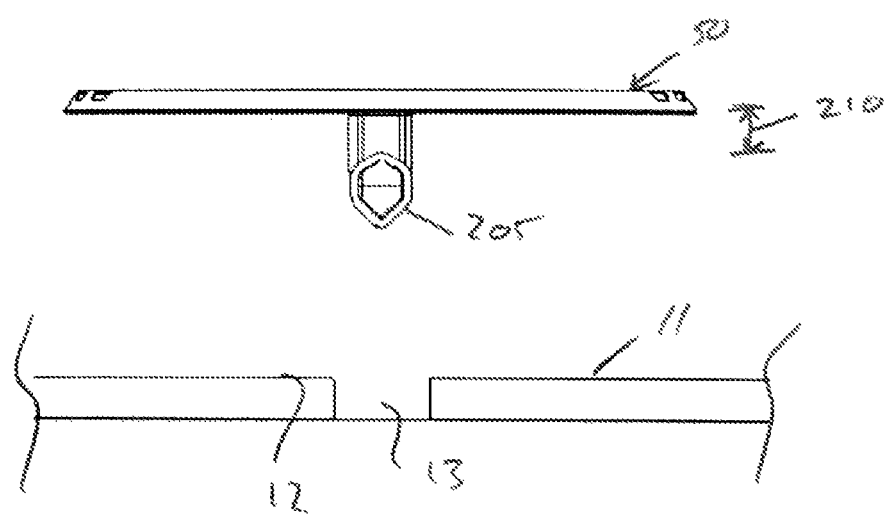
FIG. 23 is an end view of the embodiment illustrated in FIG. 18 being aligned with a gap.
Figure 24:
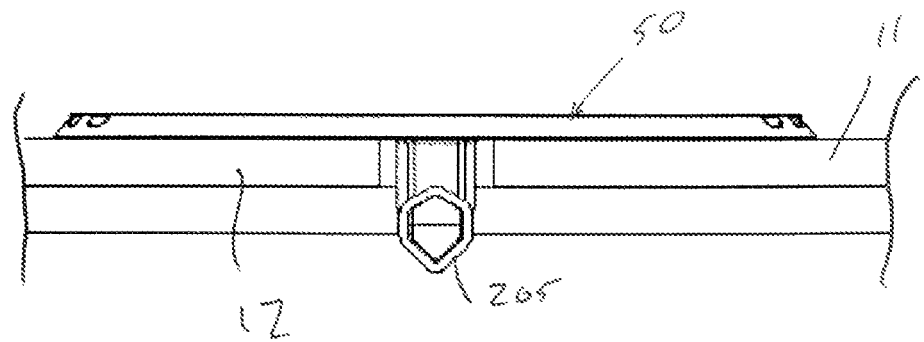
FIG. 24 is an upper perspective view showing the embodiment illustrated in FIG. 18 inserted through the gap.
Figure 25:
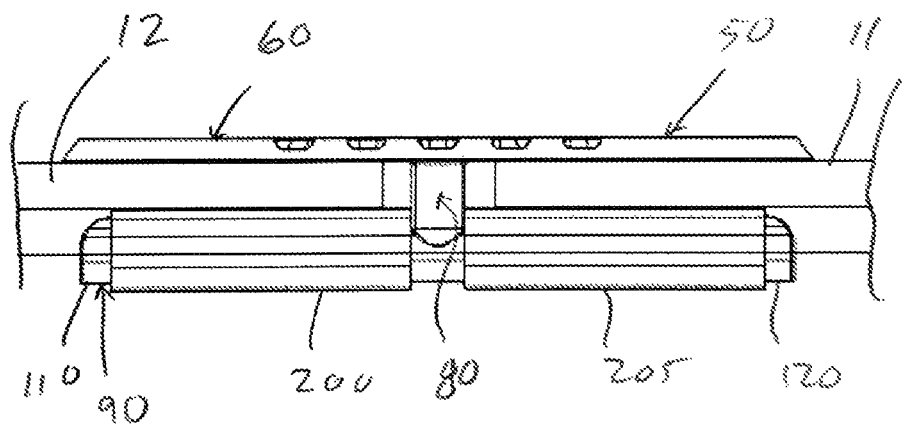
FIG. 25 is a side view showing the embodiment illustrated in FIG. 18 locking the flaps in a closed position.
Figure 26:
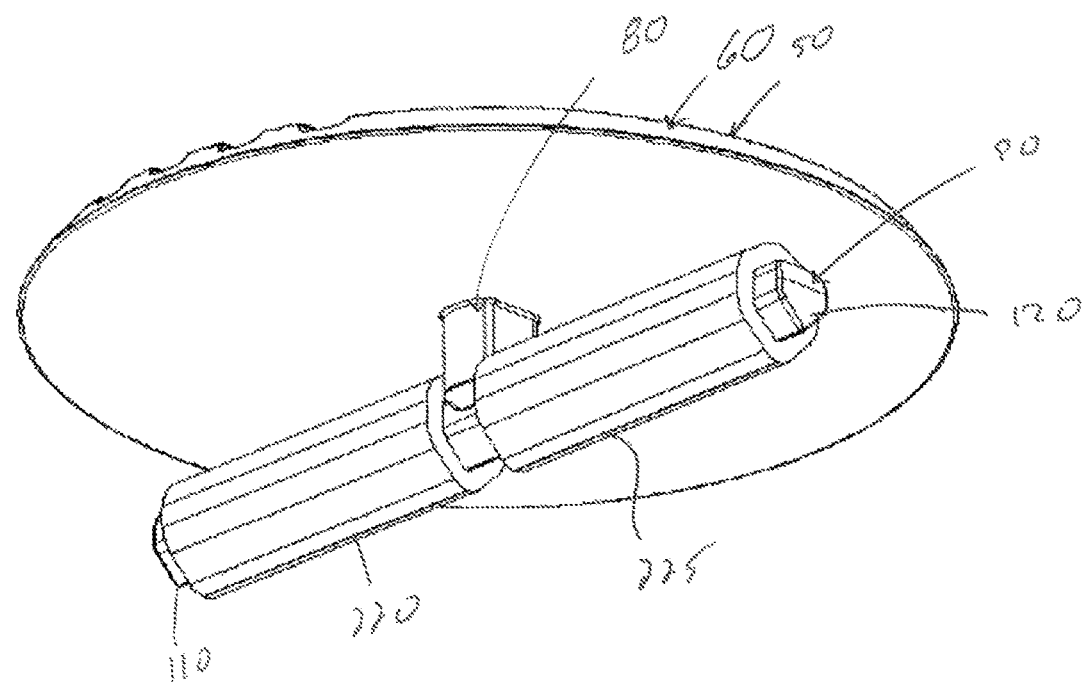
FIG. 26 is a lower perspective view of an alternative embodiment of the present invention including the closure device illustrated in FIG. 1 and sleeves.
Figure 27:
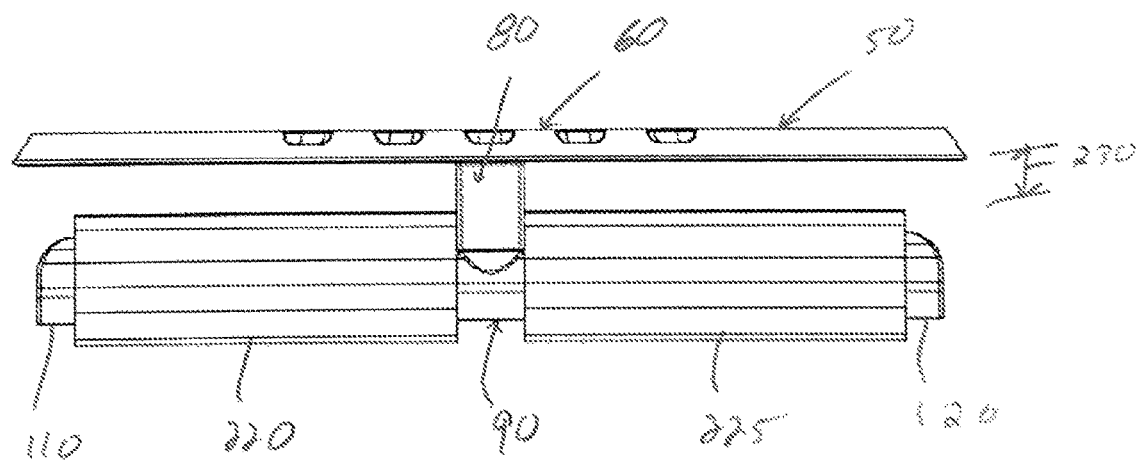
FIG. 27 is a side view of the embodiment illustrated in FIG. 26.
Figure 28:
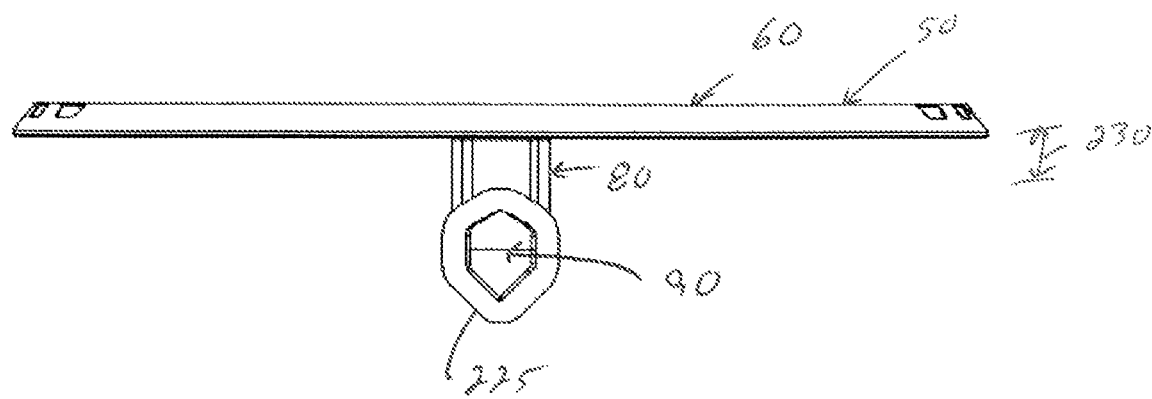
FIG. 28 is an end view of the embodiment illustrated in FIG. 26.
Figure 29:
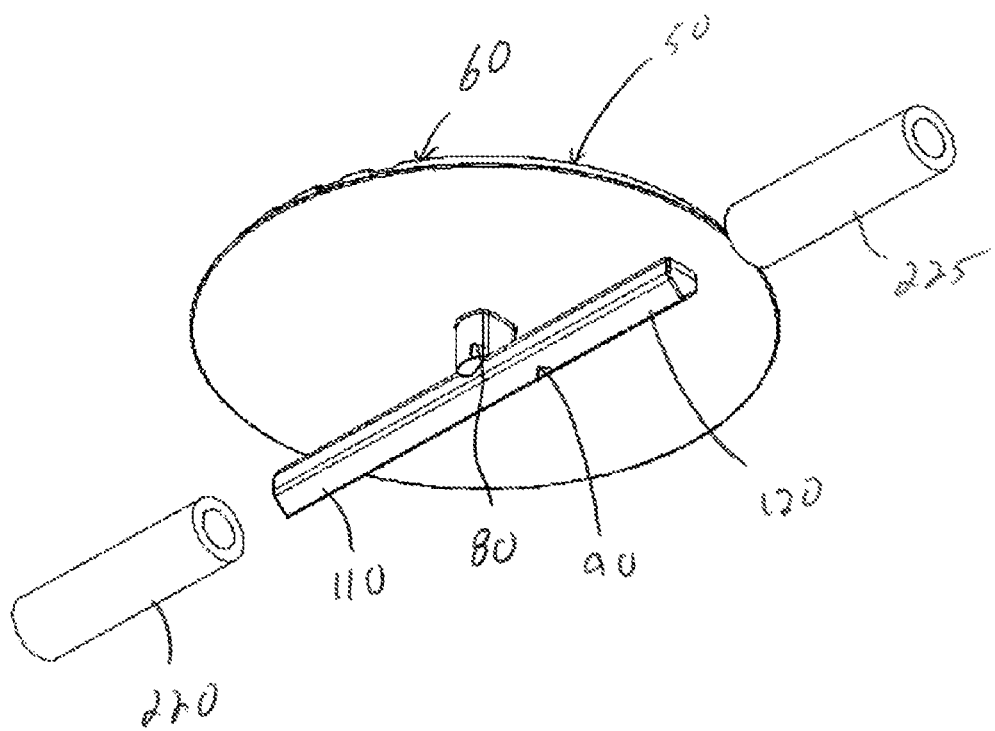
FIG. 29 is a lower perspective exploded view of the embodiment illustrated in FIG. 26.
Figure 30:
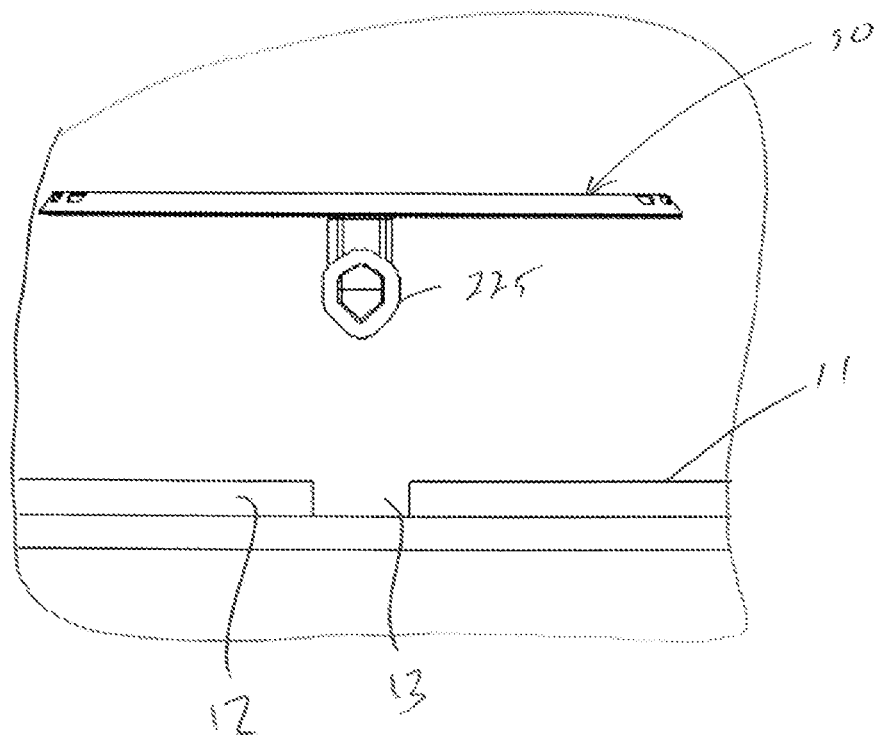
FIG. 30 is an end view of the embodiment illustrated in FIG. 26 being aligned with a gap.
Figure 31:
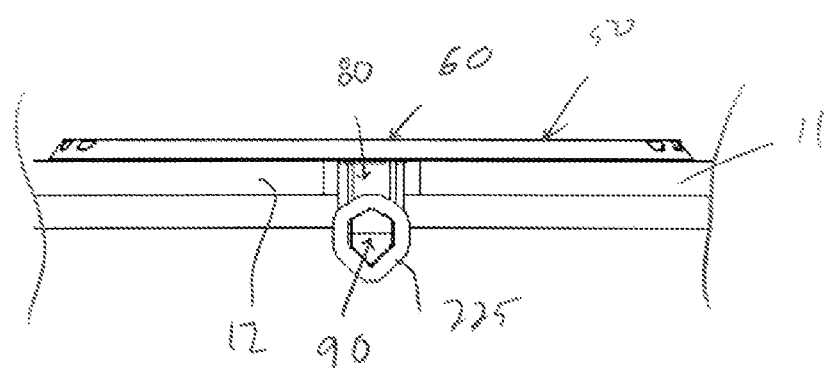
FIG. 31 is an upper perspective view showing the embodiment illustrated in FIG. 26 inserted through the gap.
Figure 32:
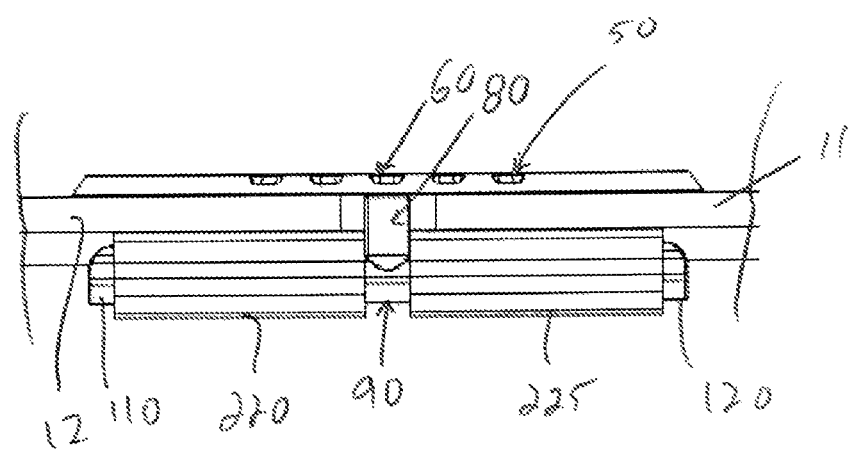
FIG. 32 is a side view showing the embodiment illustrated in FIG. 26 locking the flaps in a closed position.

Turning now to FIGS. 16 and 17, it is seen that a tamper evident device 180 is illustrated. The tamper evident device 180 has an arc 185, which corresponds to an outer perimeter shape of a closure device first piece 60. The arc 185 can be affixed to the top 10 of a box 5 with an adhesive, fastener or other suitable fixing method or device. A seal 190 can be affixed to the first piece 60 of the closure device 50 and to the arc 185 when the flaps 11 and 12 are in the locked position. The closure device 50 is preferably twisted to unlock the flaps 11 and 12. Yet, rotation of the closure device 50 will break the seal 190 evidencing tampering of the closure device 50. The seal can also be manually cut to evidence possible unlocking of the flaps. Further, as an additional alternative, one-stick tape could be used wherein an unlocking event would release the tape from a sealed position and the tape could not readily be reapplied in the original position without evidence of tampering. In a further alternative embodiment, the tamper evident device 180 can be made without an arc, wherein the seal can be connected directly to the box.

Turning now to FIGS. 18-25, it is seen how sleeves 200 and 205 can be used with the closure device 50 so that the device can be used with thinner flaps. In use, sleeve 200 can be positioned (preferably slid) onto the first section 110 of the second piece 90 and sleeve 205 can be positioned (preferably slid) onto the second section 120 of the second piece 90. The sleeves 200 and 205 conform to the external shape of the second piece 90. A space 210 between the top outer surface of the sleeves 200 and 205 and the bottom surface 62 of the first piece is less than space 130 on account of the sleeve thickness. The sleeves 200 and 205 can be made of a high friction rubber or other material that aid in frictionally retaining a desired position of the closure device 50.

Turning now to FIGS. 26-32, it is seen how sleeves 220 and 225 can be used with the closure device 50 so that the device can be used with even thinner flaps (compared to without sleeves or with sleeves 200 and 205). In use, sleeve 220 can be positioned (preferably slid) onto the first section 110 of the second piece 90 and sleeve 225 can be positioned (preferably slid) onto the second section 120 of the second piece 90. The sleeves 220 and 225 conform to the external shape of the second piece 90. A space 230 between the top outer surface of the sleeves 220 and 225 and the bottom surface 62 of the first piece is less than space 130 on account of the sleeve thickness. The sleeves 220 and 225 can be made of a high friction rubber or other material that aid in frictionally retaining a desired position of the closure device 50.

Figure 33:
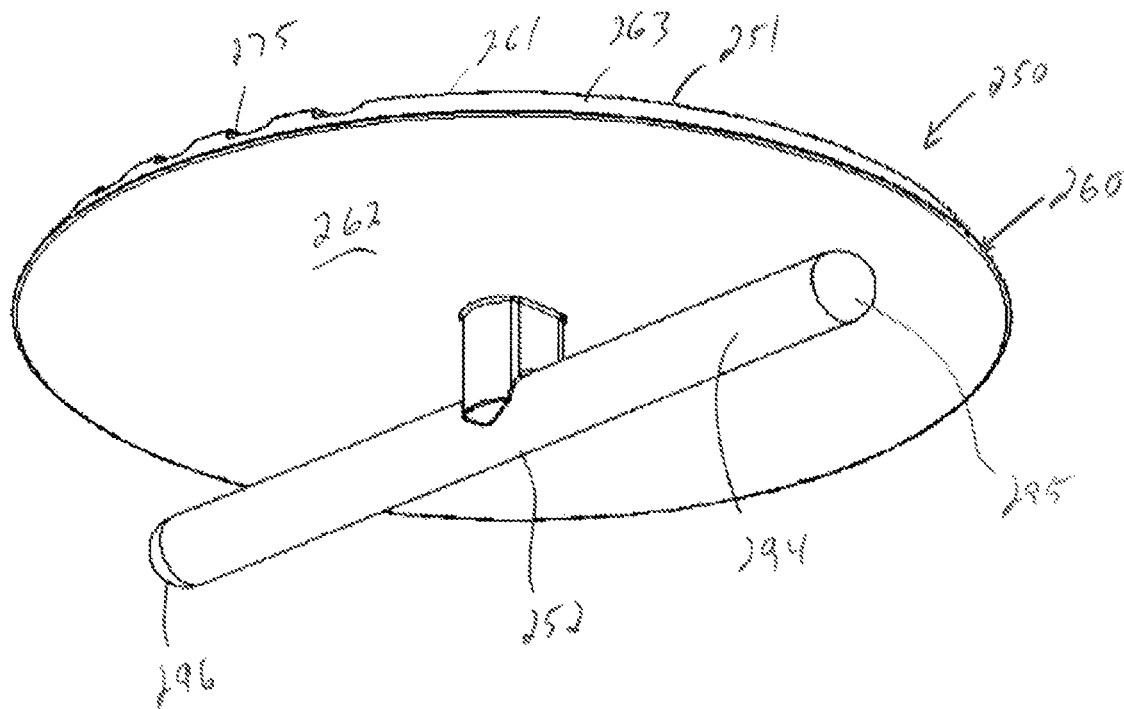
FIG. 33 is a perspective view of an alternative embodiment of the present invention.
Figure 34:
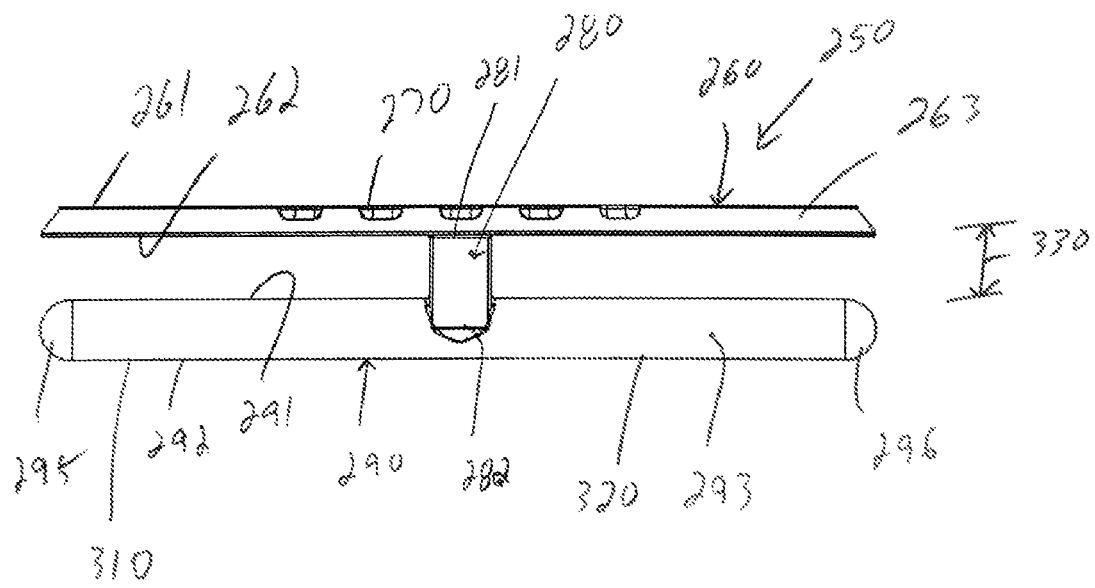
FIG. 34 is a side view of the embodiment illustrated in FIG. 33.
Figure 35:
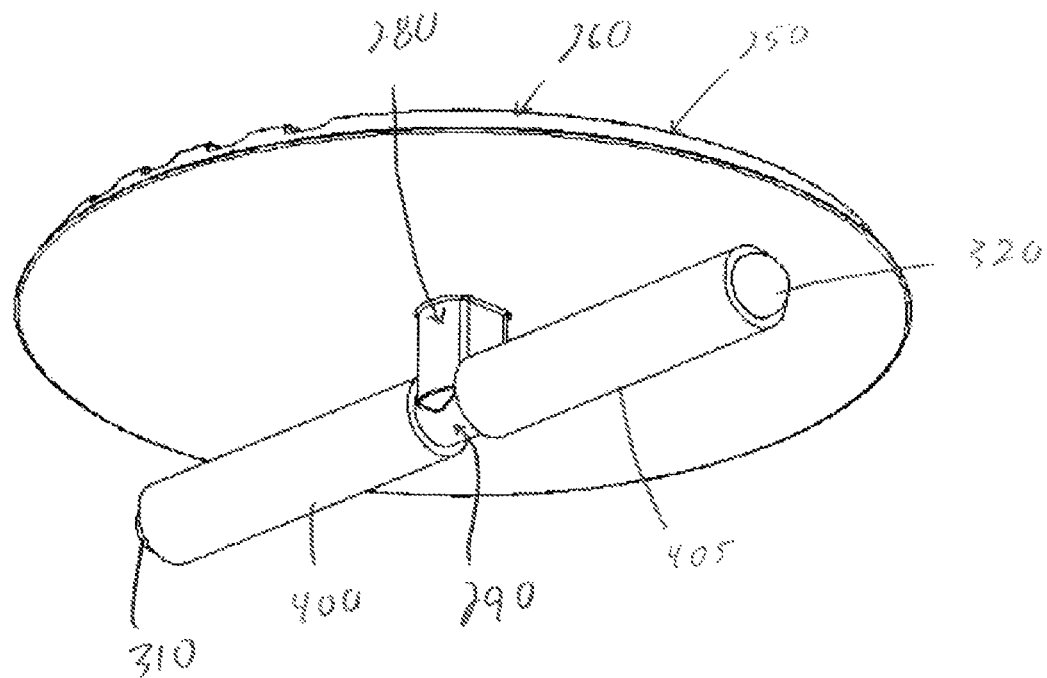
FIG. 35 is a lower perspective view of an alternative embodiment of the present invention including the closure device illustrated in FIG. 33 and sleeves.
Figure 36:
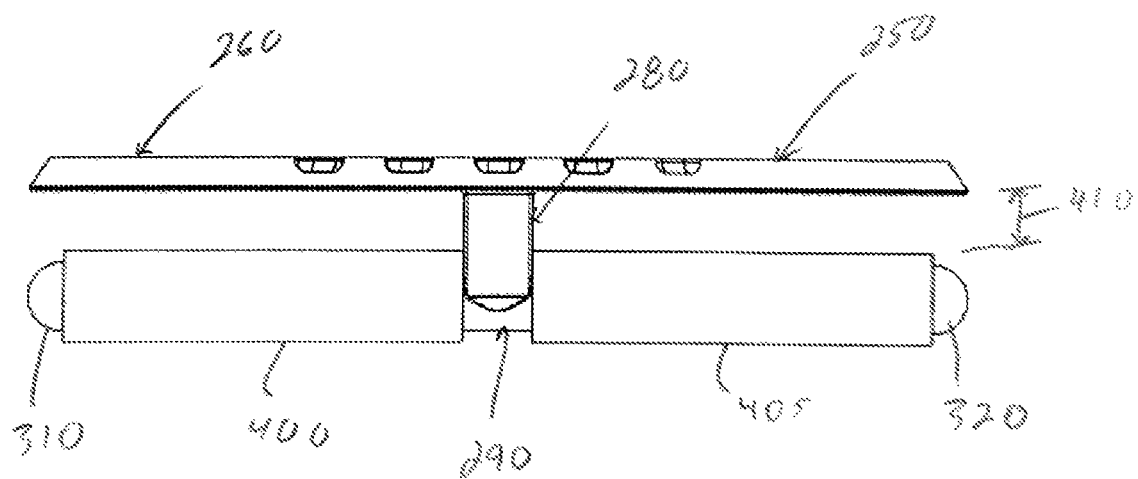
FIG. 36 is a side view of the embodiment illustrated in FIG. 35.
Figure 37:
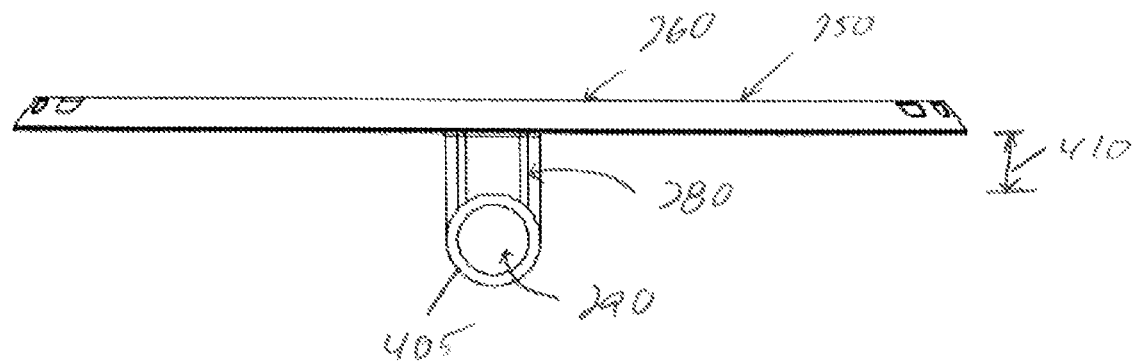
FIG. 37 is an end view of the embodiment illustrated in FIG. 35.
Figure 38:
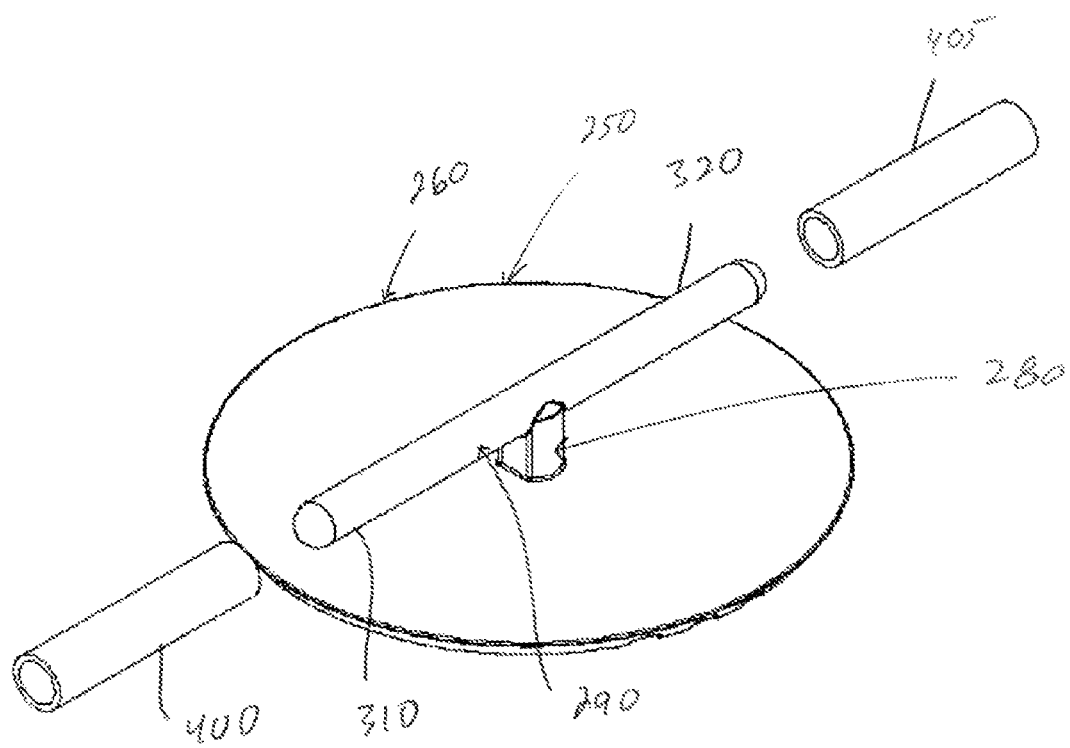
FIG. 38 is a lower perspective exploded view of the embodiment illustrated in FIG. 35.
Figure 39:
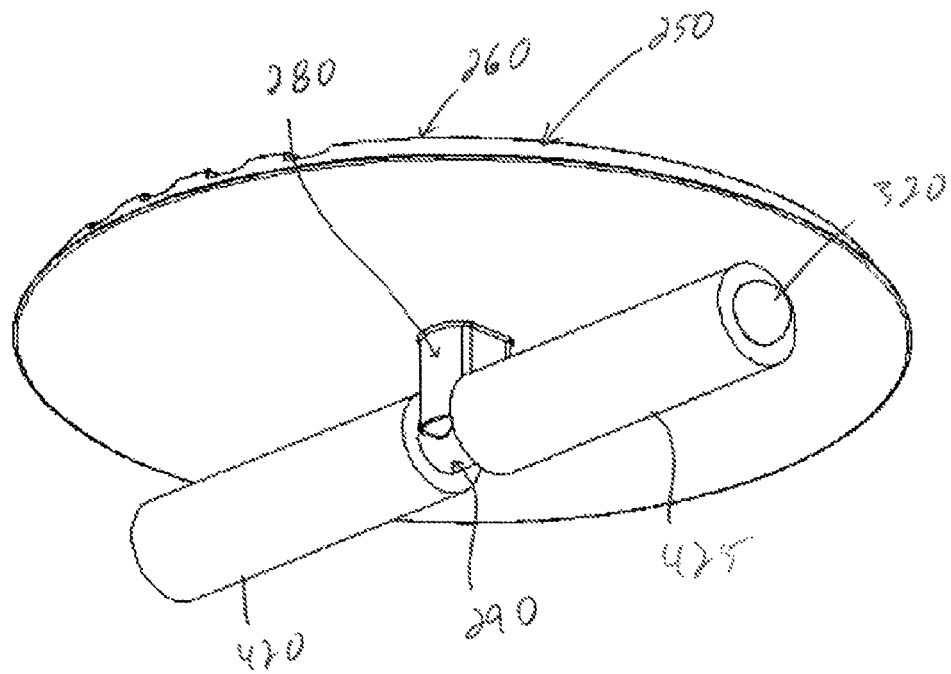
FIG. 39 is a lower perspective view of an alternative embodiment of the present invention including the closure device illustrated in FIG. 33 and sleeves.
Figure 40:
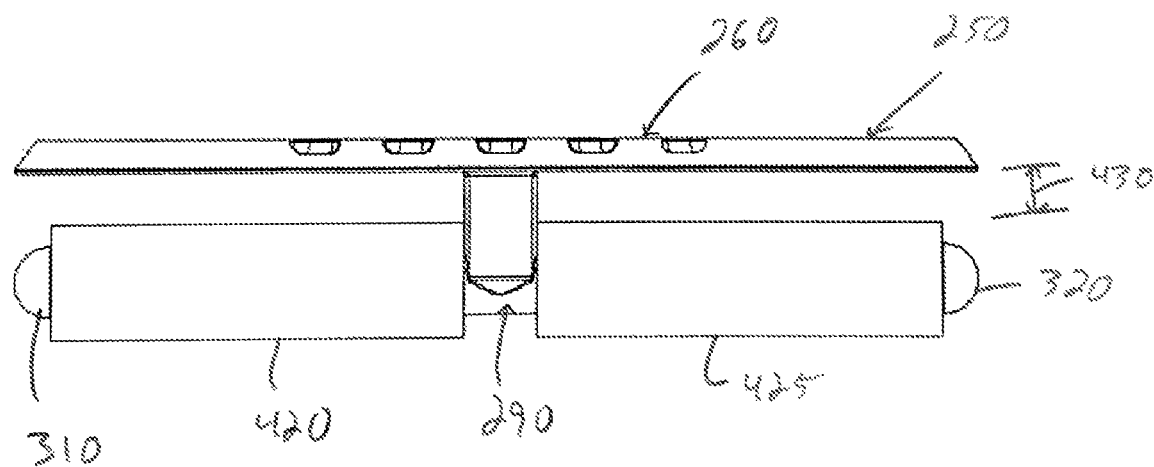
FIG. 40 is a side view of the embodiment illustrated in FIG. 39.
Figure 41:
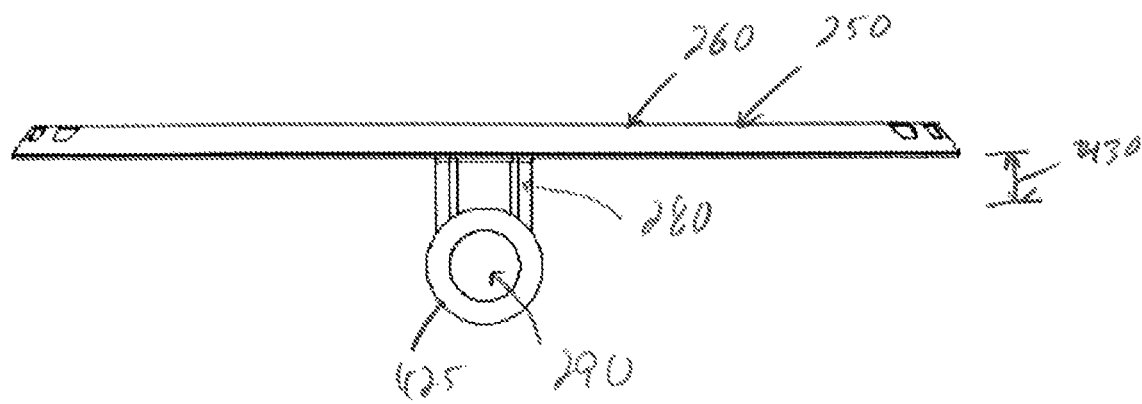
FIG. 41 is an end view of the embodiment illustrated in FIG. 39.
Figure 42:
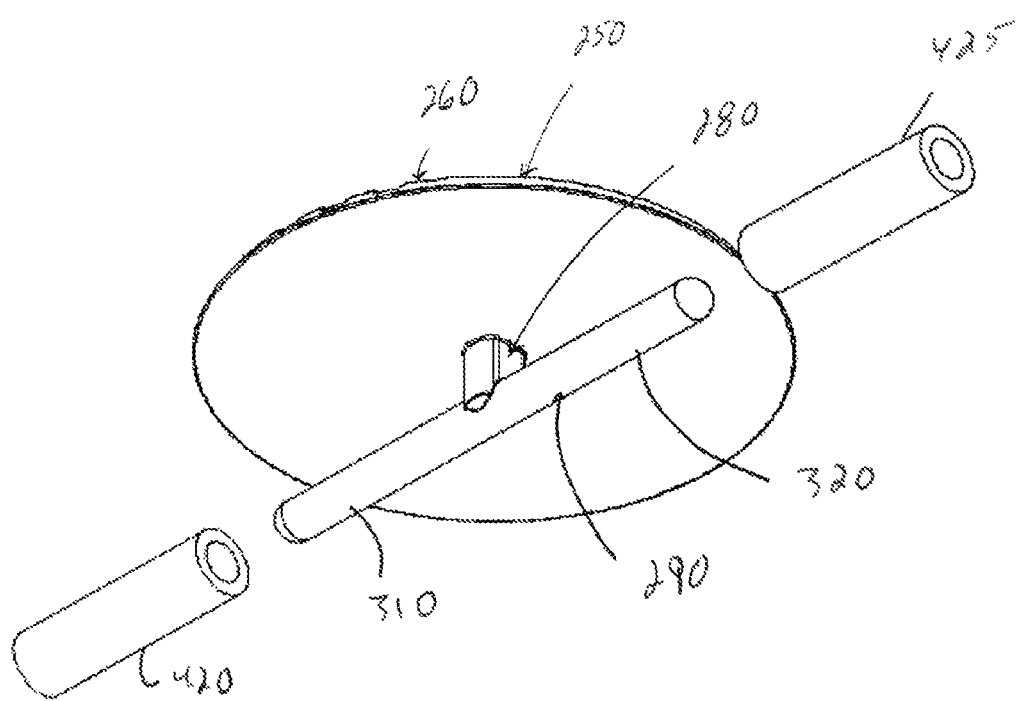
FIG. 42 is a lower perspective exploded view of the embodiment illustrated in FIG. 39.
Figure 43:
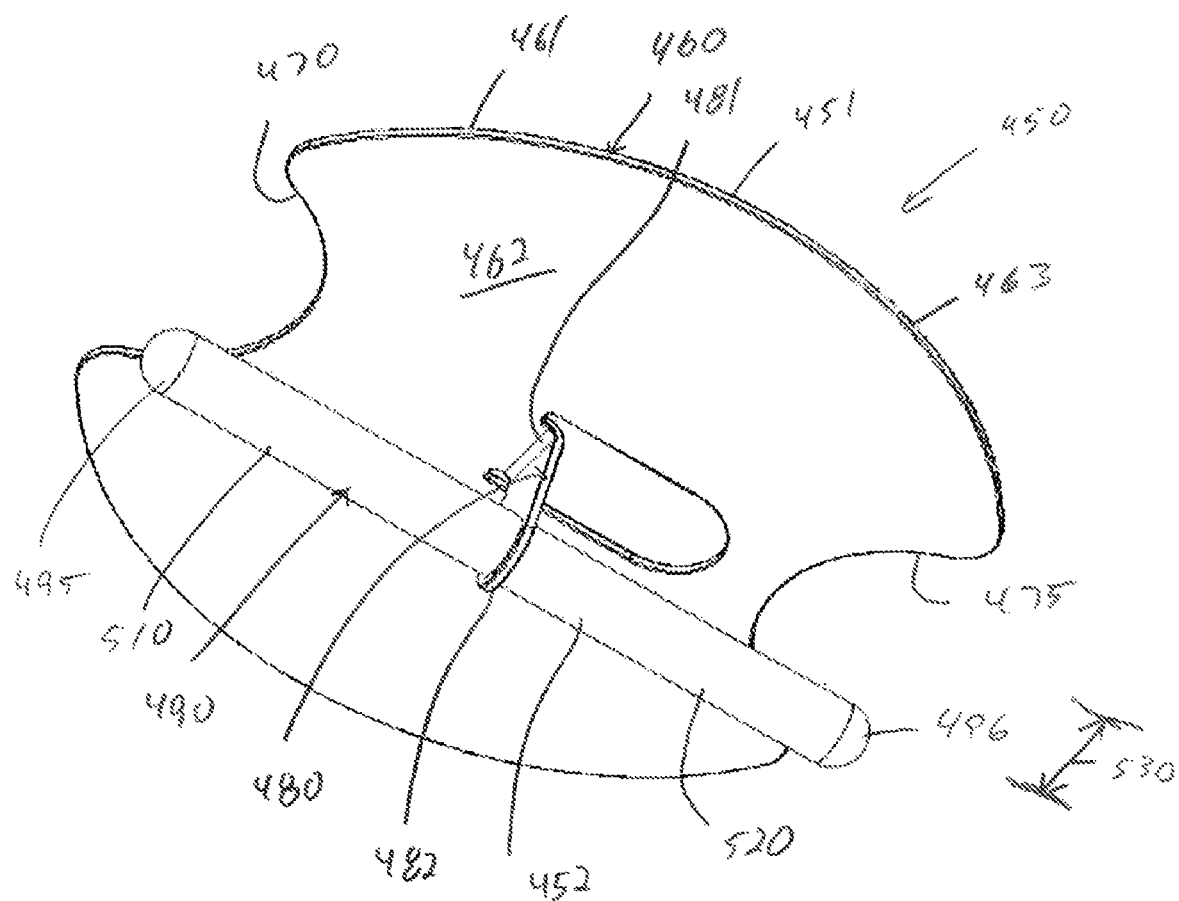
FIG. 43 is a lower perspective view showing an alternative embodiment of the present invention.
Figure 44:
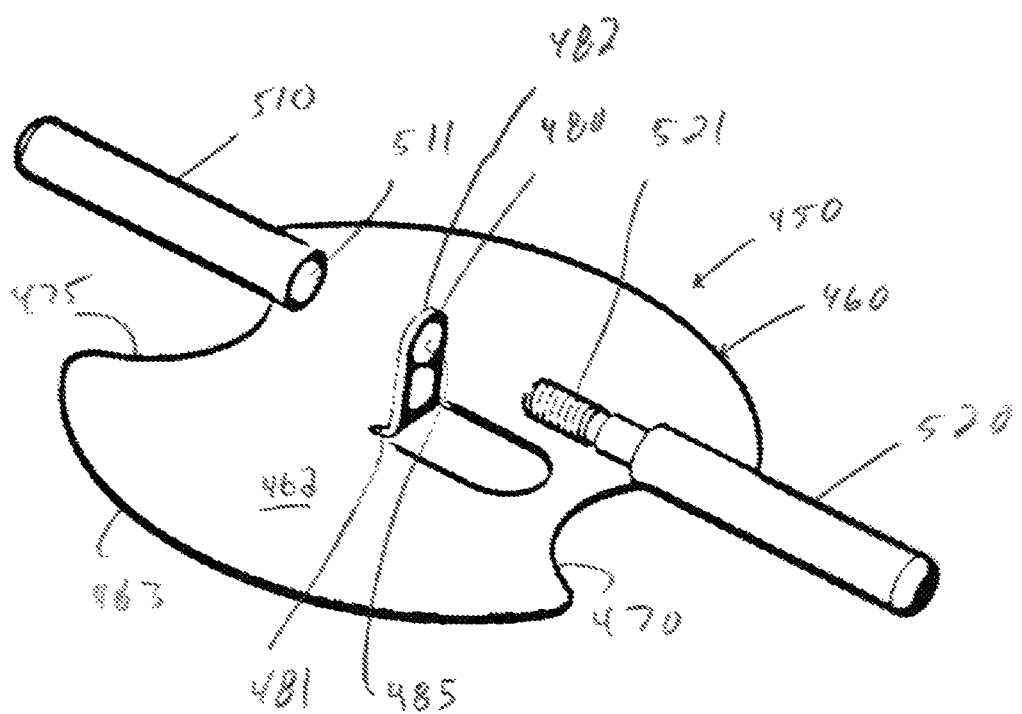
FIG. 44 is a lower perspective exploded view showing the embodiment illustrated in FIG. 43.
Figure 45:
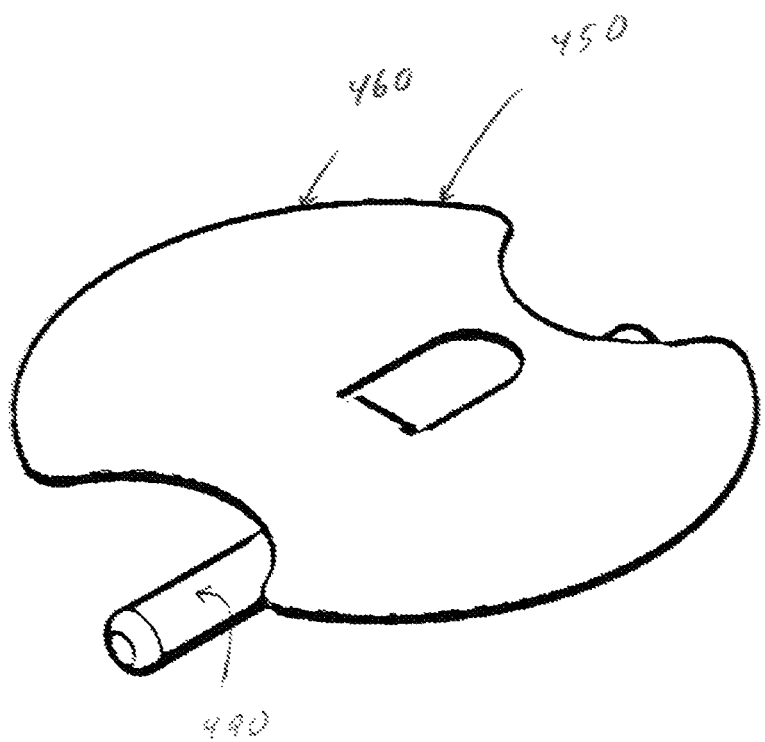
FIG. 45 is an upper perspective view showing the embodiment illustrated in FIG. 43.

Turning now to FIGS. 33-34, it is seen that an alternative preferred embodiment of the present invention is illustrated. A closure device 250 has a top 251 and a bottom 252. Device 250 has a first piece 260, a second piece 290 and a hub 280 that interconnects the first and second pieces 260 and 290, respectively. The device 250 can be made of any suitable material such as plastic.

The first piece 260 has a top surface 261 and a bottom surface 262. The first piece 260 has a perimeter 263. The perimeter 263 is preferably circular in shape. However, it is appreciated that the perimeter 263 could have different shapes without departing from the broad aspects of the present invention. There are two engagement portions 270 and 275, respectfully, that are provided on the first piece 260. There could be more or fewer engagement portions without departing from the broad aspects of the present invention. Each engagement portion preferably has at least one slot formed into the top surface 261. There are preferably multiple slots which form ribs there between. The two engagement portions 270 and 275 are located on opposite sides of the first piece.

The hub 280 has a first end 281 and a second end 282.

The second piece 290 has a top 291, a bottom 292, a first side 293, a second side 294, a first end 295 and a second end 296. The second piece 290 preferably has a round cross-section. The hub 280 contacts the second piece 290 generally equidistant between ends 295 and 296, respectively, thereby bisecting the second piece 290 into a first section 310 and a second section 320. The first section 310 and second section 320 are preferably equal in length. The first piece 260, hub 280 and second piece 290 are preferably stationary with respect to each other. The top 291 of the second piece 290 is spaced by a space 330 from the bottom surface 262 of the first piece 260.

Use of closure device 250 is similar to the use of closure device 50 described above. The second piece 290 can be aligned with the gap 13 between flaps 11 and 12. It is appreciated that the gap 13 can be wider or narrower in a given box. The second piece 290, being round in cross-section, can smoothly pass between the flaps 11 and 12 even if the gap is narrower than the second piece 290, as the second piece 290 can separate or push out the flaps 11 and 12 when necessary. The shape of the second piece 290 also aids in gliding the device 250 to a locked position. The glide is useful for both clockwise and counterclockwise twisting of the device 250, and is effective if the flaps are bent, damaged or even slightly thicker than the space 330 between the first piece 260 and second piece 290.

The device 250 locks the flaps 11 and 12 in the closed position when the flaps 11 and 12 are between the first (top) piece 260 and second (bottom) piece 290. It is appreciated that the engagement portions 270 and 275 can lie on an engagement axis, and that the engagement axis can be perpendicular to a second piece longitudinal axis. It is appreciated that other axis relationships could be used without departing from the broad aspects of the present invention. However, with the preferred arrangement, a user is certain that the flaps 11 and 12 are locked when the first piece 60 is flush against the flaps 11 and 12, and the engagement portions 270 and 275 are aligned with the gap 13. It is appreciated that the lock status is known even though the second piece is not directly observable by the user when inserted between the flaps 11 and 12.

Turning now to FIGS. 35-38, it is seen how sleeves 400 and 405 can be used with the closure device 250 so that the device can be used with thinner flaps. In use, sleeve 400 can be positioned (preferably slid) onto the first section 310 of the second piece 290 and sleeve 405 can be positioned (preferably slid) onto the second section 320 of the second piece 290. The sleeves 400 and 405 conform to the external shape of the second piece 290. A space 410 between the top outer surface of the sleeves 400 and 405 and the bottom surface 262 of the first piece is less than space 330 on account of the sleeve thickness. The sleeves 400 and 405 can be made of a high friction rubber or other material that aid in frictionally retaining a desired position of the closure device 250.

Turning now to FIGS. 39-42, it is seen how sleeves 420 and 425 can be used with the closure device 250 so that the device can be used with even thinner flaps (compared to without sleeves or with sleeves 400 and 405). In use, sleeve 420 can be positioned (preferably slid) onto the first section 310 of the second piece 290 and sleeve 425 can be positioned (preferably slid) onto the second section 320 of the second piece 290. The sleeves 420 and 425 conform to the external shape of the second piece 290. A space 430 between the top outer surface of the sleeves 420 and 425 and the bottom surface 262 of the first piece is less than space 330 on account of the sleeve thickness. The sleeves 420 and 425 can be made of a high friction rubber or other material that aid in frictionally retaining a desired position of the closure device 250.

Turning now to FIGS. 43-46, it is seen that a further alternative preferred embodiment of a closure device 450 is illustrated. The closure device 450 has a top 451 and a bottom 452. Device 450 has a first piece 460 with a depending hub 480, and a second piece 490. The device 450 can be made of any suitable material such as metal or another material that can be formed or bent.

The first piece 460 has a top surface 461 and a bottom surface 462. The first piece 460 has a perimeter 463. The perimeter 463 is preferably circular in shape. However, it is appreciated that the perimeter 463 could have different shapes without departing from the broad aspects of the present invention. There are two engagement portions 470 and 475, respectfully, that are provided on the first piece 460. There could be more or fewer engagement portions without departing from the broad aspects of the present invention. Each engagement portion 470 and 475 is preferably an inwardly oriented radial notch. The two engagement portions 470 and 475 are located on opposite sides of the first piece. The hub 480 has a first end 481 and a second end 482. The hub 480 is preferably formed by bending the material at the first end 481 wherein the hub 480 lies in a plane that is generally perpendicular to a top surface plane. The hub 480 has a hub hole 485 located between the ends 481 and 482. The hole 485 has a hole axis that is perpendicular to the hub plane.

The second piece 490 preferably has a round cross-section and has a first end 495 and a second end 496. The second piece 490 is preferably made of two sections 510 and 520, respectively. Section 510 has a threaded hole 511 formed into one end. Section 520 has a fastener (preferably a threaded protrusion) 521 extending from one end. The fastener 521 is extended through hub hole 485 and then threaded into threaded hole 511 of section 510 to secure the second piece 490 to the hub 480, and also to the first piece 460. The first section 510 and second section 520 are preferably equal in length. The first piece 460, hub 480 and second piece 490 are preferably stationary with respect to each other when in use as a closure device. The top of the second piece 490 is spaced by a space 530 from the bottom surface 462 of the first piece 460.

Use of closure device 450 is similar to the use of closure device 250 described above.

Figure 47:
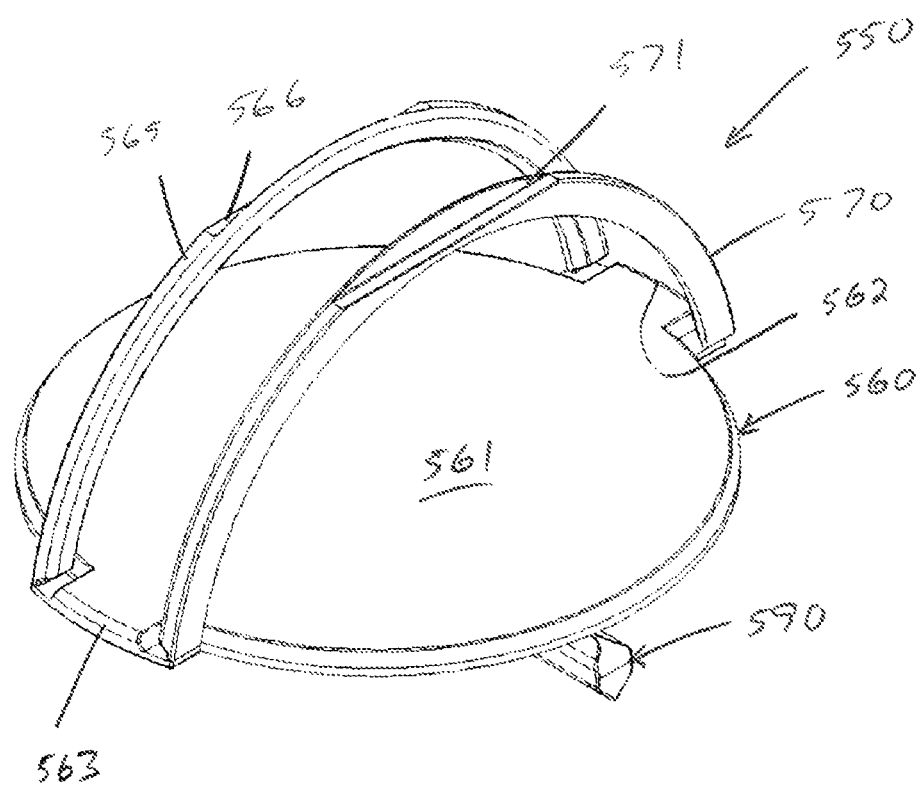
FIG. 47 is an upper perspective view showing an alternative embodiment of the present invention.
Figure 48:
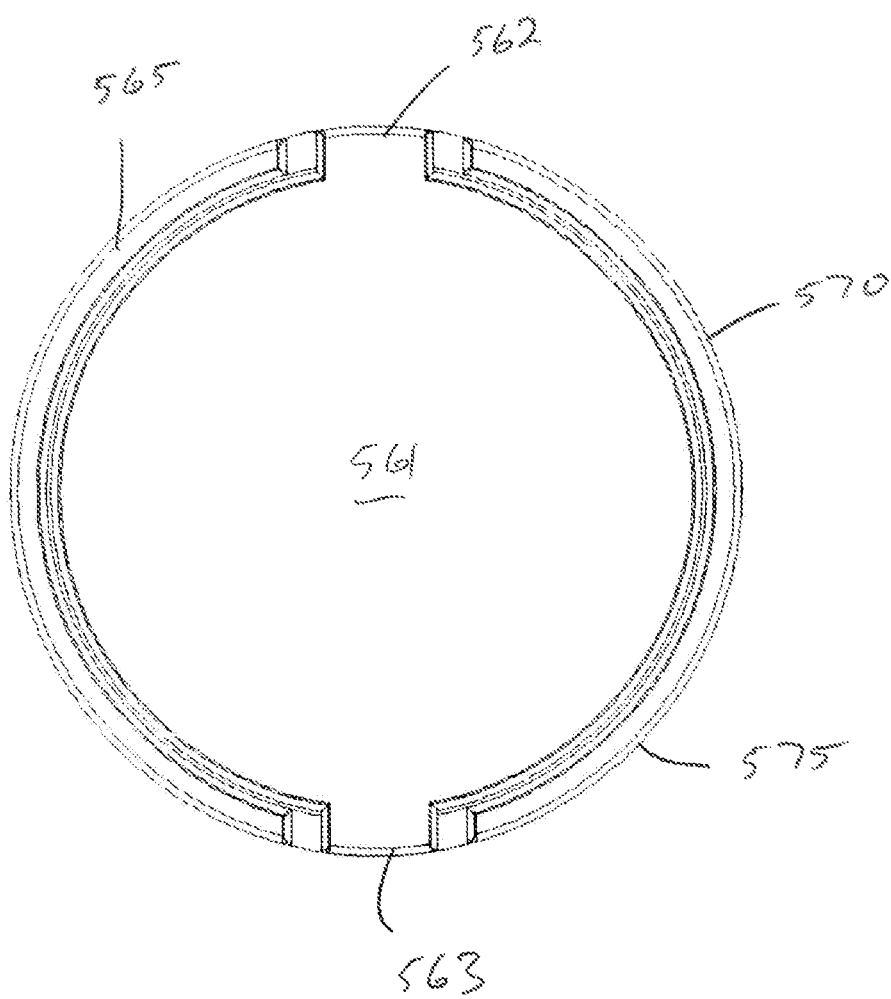
FIG. 48 is a top view of the embodiment illustrated in FIG. 47.

Looking now to FIGS. 47 and 48, it is seen that a further preferred embodiment of a closure device 550 of the present invention is illustrated. The closure device 550 has a top 551 and a bottom 552. Device 550 has a first piece 560, a hub (not shown) and a second piece 590. The device can be made of any suitable material. One preferred material is plastic.

The first piece 560 has a stationary portion 561 with a surface. The stationary portion has protrusions 562 and 563 that extend from opposite sides of the stationary portion. The surface is preferably flat. A first arm 565 with and engagement portion 566 is provided. A second arm 570 with an engagement portion 571 is provided. The first arm 565 and second arm 570 are preferably connected (preferably integrally formed in a pivoting manner) with the protrusions 562 and 563 of the stationary portion 561. The first arm 565 and second arm 570 can lay flat adjacent the outer perimeter of the stationary portion 561. When in this position, the first piece is generally round with a perimeter 575. The arms 565 and 570 can be engaged by undercut engagement portions 566 and 571, respectively, to move the arms from flat positions to upright positions. When in full upright positions, the arms 565 and 570 are generally parallel to each other and both are generally perpendicular to a surface plane of the stationary portion 561.

The hub interconnects the first piece 560 with a second piece 590. The second piece 590 can be a blade or a rod (or other shape) without departing from the broad aspects of the present invention.

The user can twist the closure device 550 when the arms are in upright positions.

Figure 49:
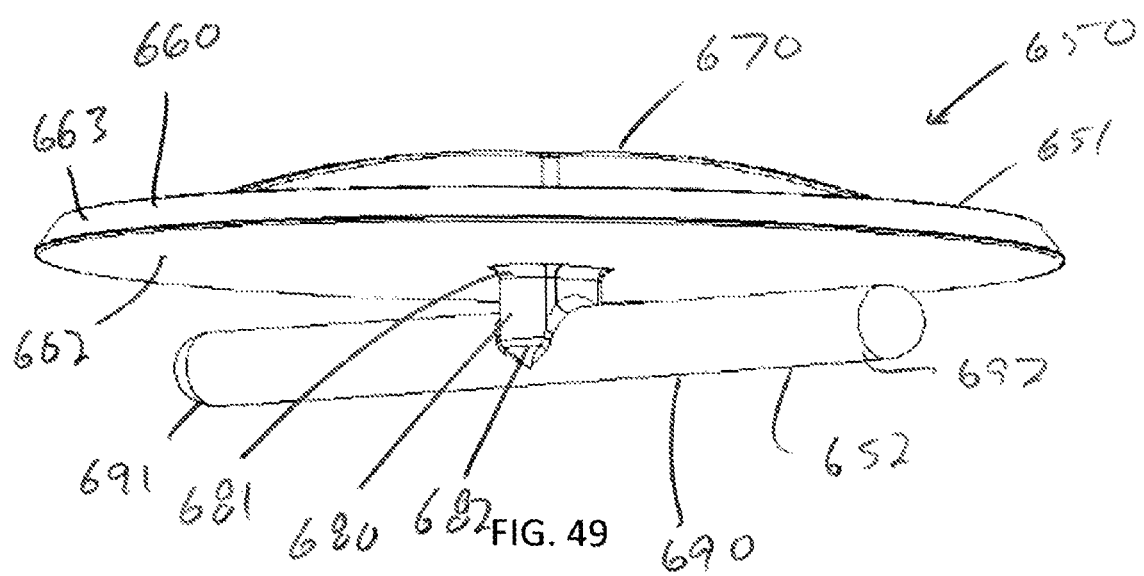
FIG. 49 is a lower perspective view of an alternative embodiment of the present invention.
Figure 50:
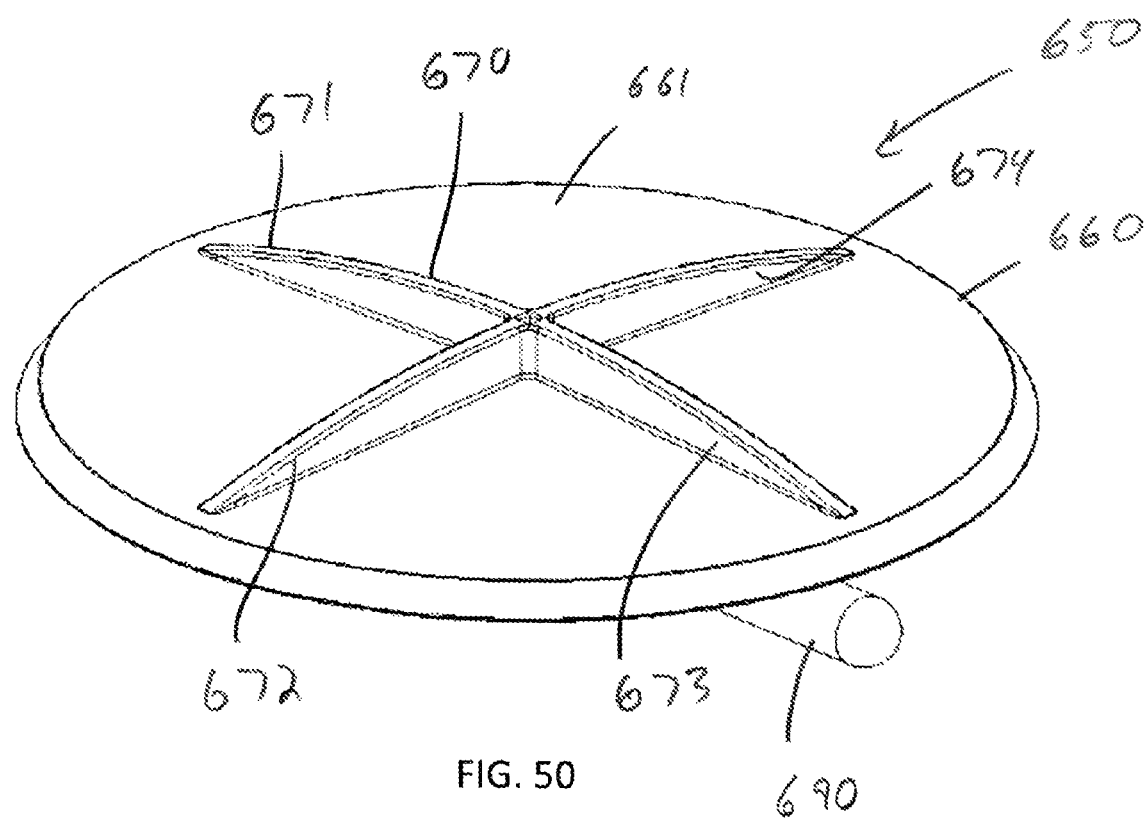
FIG. 50 is an upper perspective view of the embodiment illustrated in FIG. 49.
Figure 51:
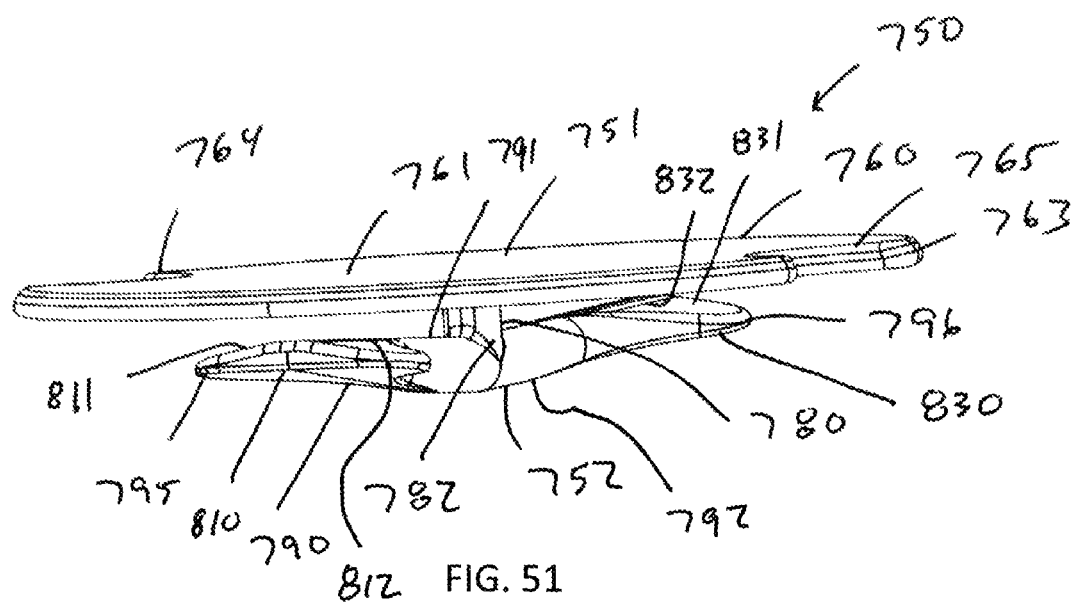
FIG. 51 is an upper perspective view of a preferred embodiment of the present invention.
Figure 52:
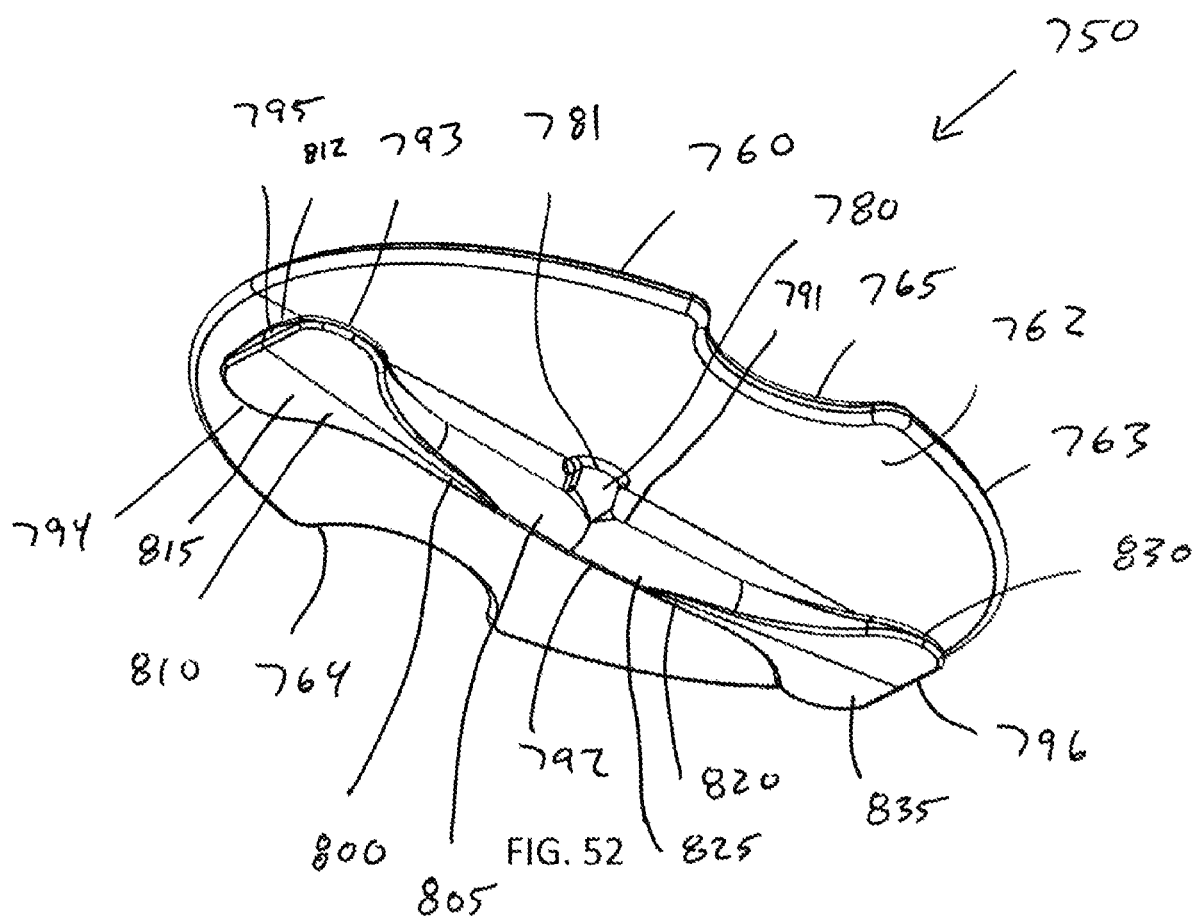
FIG. 52 is a lower perspective view of the embodiment illustrated in FIG. 51.
Figure 53:
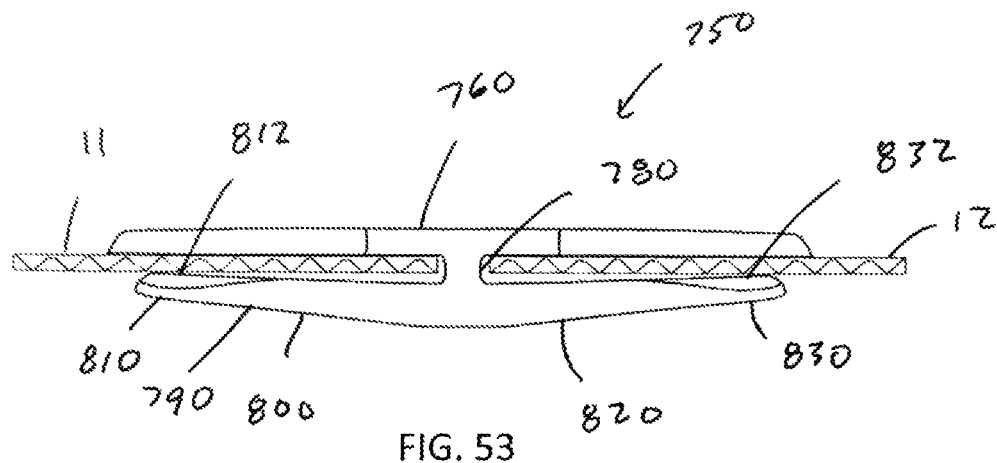
FIG. 53 is a side view of the embodiment illustrated in FIG. 50 shown with box flaps between the upper and lower pieces.
Figure 54:
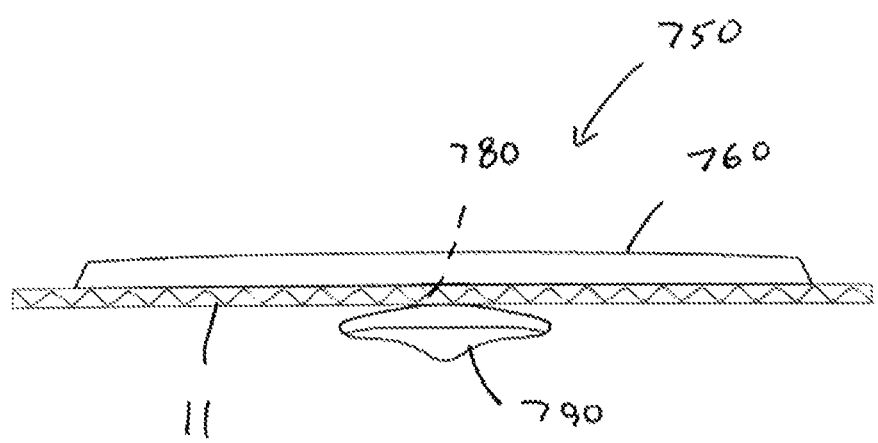
FIG. 54 is an end view of the embodiment illustrated in FIG. 53.
Figure 55:
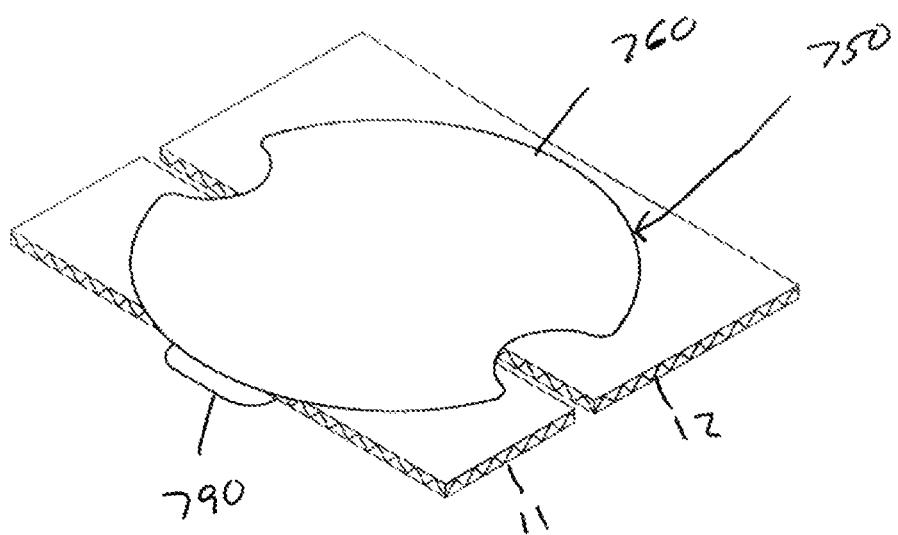
FIG. 55 is an upper perspective view of the embodiment illustrated in FIG. 53.
Figure 56:
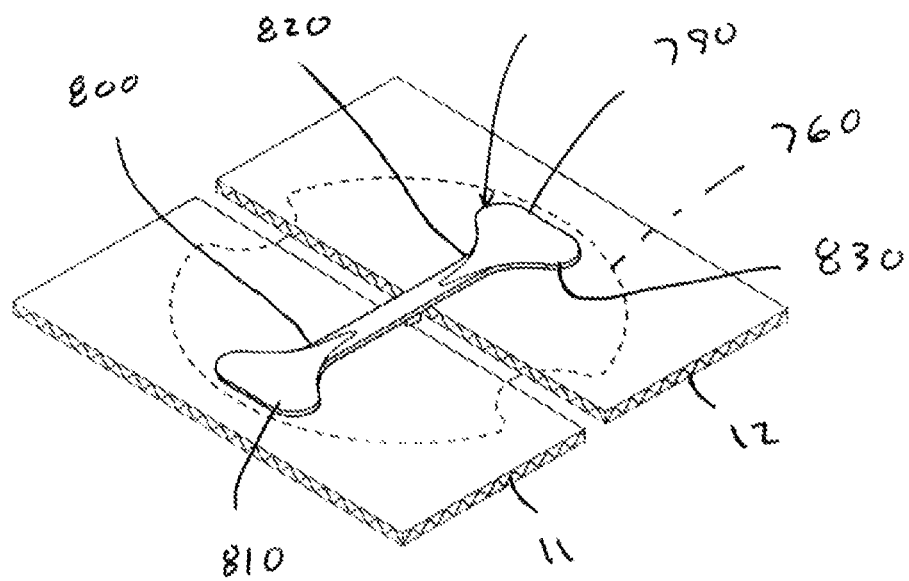
FIG. 56 is a lower perspective view of the embodiment illustrated in FIG. 53.
Figure 57:
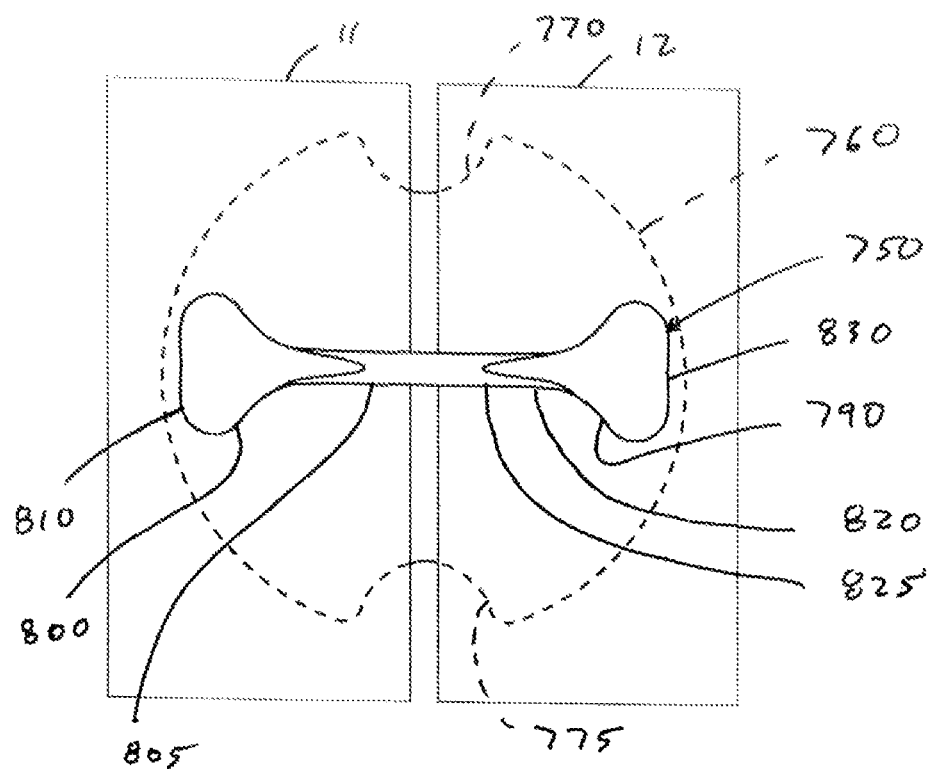
FIG. 57 is a bottom view of the embodiment illustrated in FIG. 53.
Figure 58:
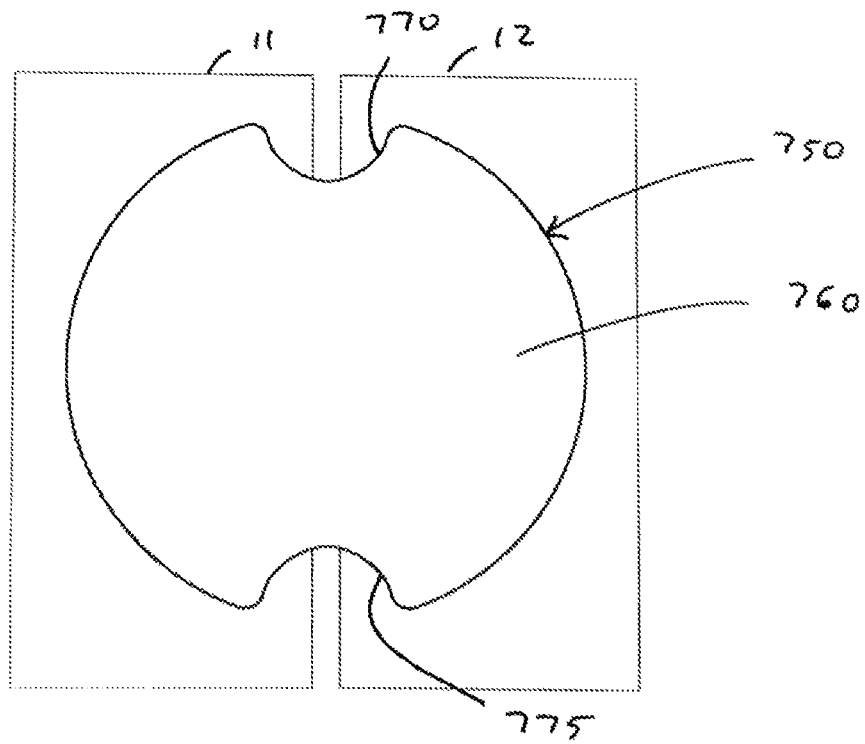
FIG. 58 is a top view of the embodiment illustrated in FIG. 53.
Figure 59:
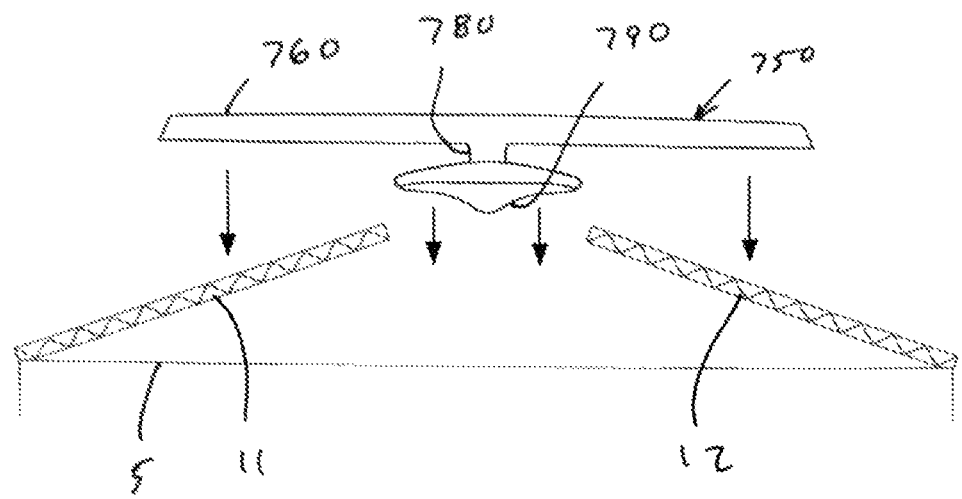
FIG. 59 is an end view showing the closure approaching a box between the ends of two flaps.
Figure 60:
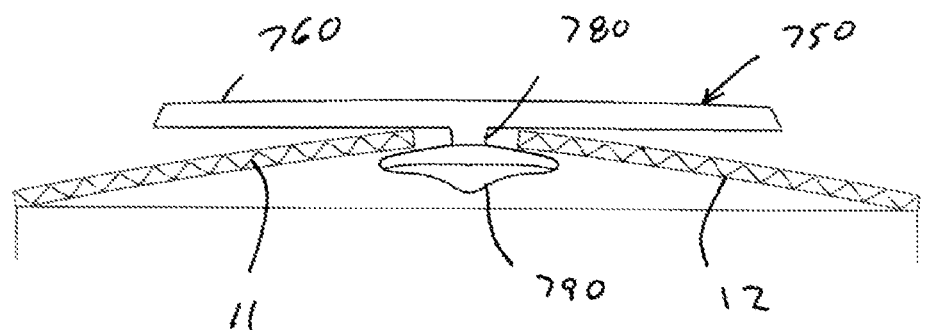
FIG. 60 is similar to FIG. 59 but shows the bottom piece of the closure below the flaps and the flaps being forced into engagement with the upper bevel.
Figure 61:
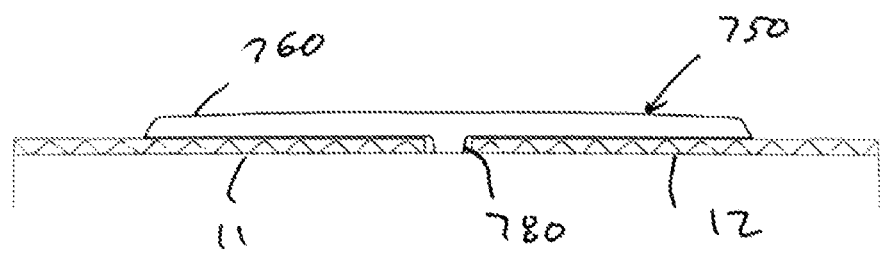
FIG. 61 is similar to FIG. 60 but shows the first piece flat atop the box.

Turning now to FIGS. 49 and 50, it is seen that a further alternative embodiment of a closure device 650 of the present invention is illustrated. The closure device has a top 651 and a bottom 652.

A first piece 660 is at the top 651. The first piece 660 has a top surface 661 and a bottom surface 662. The first piece 660 has an outer perimeter 663, which is preferably angled. An engagement portion 670 is on the top surface 661. The engagement portion preferably has four fins (671, 672, 673 and 674, respectively) that fan out radially (linearly in a radial direction) from a central point. It is appreciated that while four fins are shown, that there could be more or fewer without departing from the broad aspects of the present invention. The fins are shown to be radiused, which advantageously allow an item that may come into contact with the closure device to slide over the closure device instead of dislodging the closure device. Yet, it is appreciated that the fins can have flat tops without departing from the broad aspects of the present invention.

A hub 680 with opposed ends 681 and 682, separates the first piece 660 from a second piece 690. The second piece 690 can be a rod having a first section 691 and second section 692. The rod can be the same as embodiments described above.

It is appreciated that the invention can be made in any suitable method, including but not being limited to, molding and 3D printing.

It is appreciated that the hubs of the invention can by made to any suitable length or height to accommodate a multitude of box wall thicknesses.

Turning now to FIGS. 51-64, it is seen that an additional preferred embodiment of the present invention is illustrated. A closure device 750 has a top 751 and a bottom 752. Device 750 has a first piece 760, a second piece 790 and a hub 780 that interconnects the first and second pieces 760 and 790, respectively. The device 750 can be made of any suitable material such as, but not limited to, plastic or metal. Plastic parts can be made by any suitable method, including but not being limited to molding or 3D printing.

The first piece 760 has a top surface 761 and a bottom surface 762. The first piece 760 has a perimeter 763. The perimeter 763 is preferably generally circular in shape (except for engagement portions). However, it is appreciated that the perimeter 763 could have different shapes without departing from the broad aspects of the present invention. There are two engagement portions 770 and 775, respectfully, that are provided on the first piece 760. The engagement portions 770 and 775 are located on opposite sides of the first piece 760 and are formed as generally semicircular indentations from the outer perimeter 763.

The hub 780 has a first end 781 and a second end 782.

The second piece 790 has a top 791, a bottom 792, a first side 793, a second side 794, a first end 795 and a second end 796. The second piece 790 has a first section 800 and a second section 820. The first and second sections 800 and 820 are preferably symmetrical about the hub 780.

The first section 800 has a member 805 that transitions into a lobe 810 at the distal end of the section 800. The member 805 is preferably a round member (but could have other profile shapes without departing from the broad aspects of the present invention). The lobe 810 has a top face 811 with a central crown 812, and a bottom face 815 that is preferably flat. The top face and bottom face have an outer perimeter with an increased surface area in comparison to the member. The top of the crown 812 of the upper face 811 has an axis that is preferably colinear with the top of the member 805 (when undeflected). The pitch of the top of the crown and top of the member can be angled wherein there is a greater distance between the first piece 760 and second piece 790 at the hub 780, and a smaller distance therebetween at distal end 795 of the second piece 790. The bottom face 815 is preferably angled in a manner wherein the lobe 810 is thinnest at the section distal end. The face 815 extends into the member and reduces the effective height of the transition section (diameter of member minus section of member removed with intersection of face).

The second section 820 has a member 825 that transitions into a lobe 830 at the distal end of the section 820. The member 825 is preferably a round member (but could have other profile shapes without departing from the broad aspects of the present invention). The lobe 830 has a top face 831 with a central crown 832, and a bottom face 835 that is preferably flat. The top face and bottom face have an outer perimeter with an increased surface area in comparison to the member. The top of the crown 832 of the upper face 831 has an axis that is preferably colinear with the top of the member 835 (when undeflected). The pitch of the top of the crown and top of the member can be angled wherein there is a greater distance between the first piece 760 and second piece 790 at the hub 780, and a smaller distance therebetween at distal end 796 of the second piece 790. The bottom face 835 is preferably angled in a manner wherein the lobe 830 is thinnest at the section distal end. The face 835 extends into the member and reduces the effective height of the transition section (diameter of member minus section of member removed with intersection of face).

Both sections 800 and 820 are tallest near the hub 780, and then become thinner from a middle section to the thinnest point at the section distal ends (on account of the angled flat bottom faces of the lobes). Hence, the sections are strongest in resistance to deflection at the hubs, and are most flexible at the distal ends. This allows the sections to deflect to accommodate and engage the box flaps. Sections 800 and 820 are preferably symmetrical about the hub.

Each of the lobes 810 and 830 are individually symmetrical about the second piece longitudinal axis. This allows for easy use in clockwise and counterclockwise twisting. The first piece 760, hub 780 and second piece 790 are preferably stationary with respect to each other.

Use of closure device 750 during the locking process is illustrated in FIGS. 59-64. Looking at FIG. 59, it is seen that the second piece 790 can be aligned with the gap 13 between flaps 11 and 12. It is appreciated that the gap 13 can be wider or narrower in a given box. The second piece 790 is shown inserted through the gap in FIGS. 60 and 61. It is appreciated that the space 840 between the top 791 of the second piece 790 and the bottom surface 762 of the first piece 760 is greater than or similar to the thickness of flaps 11 and 12. In the pitched embodiments, the closure device can be utilized with flaps with multiple thicknesses. The crowned top face 811 directs the flaps into position between the top piece 760 and bottom piece 790 as the flaps are pushed to flat positions.

Figure 62:
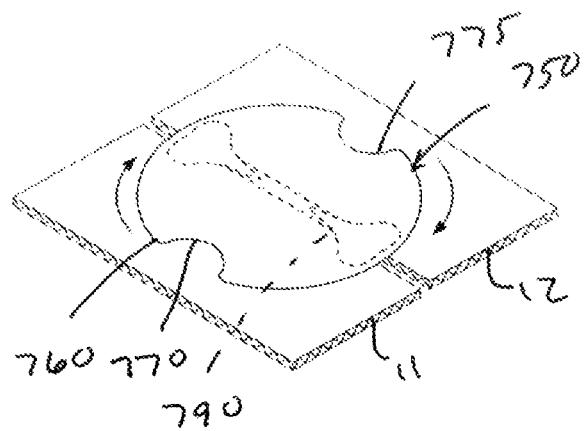
FIG. 62 is an upper perspective vie of the embodiment illustrated in FIG. 61.
Figure 63:
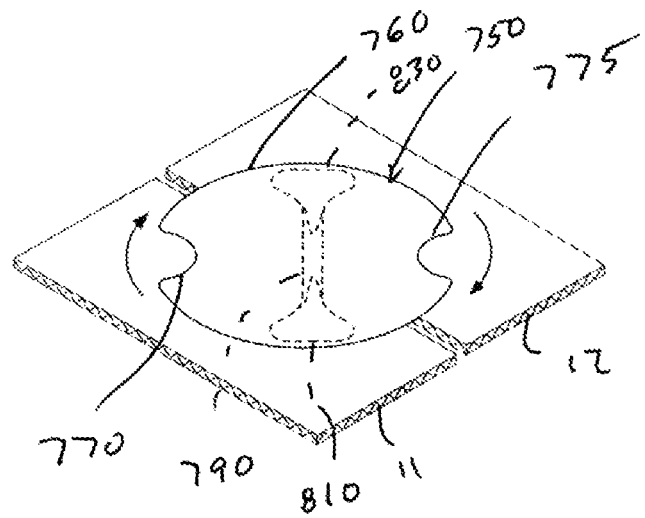
FIG. 63 is a perspective view showing the closure being rotated towards the locked position.
Figure 64:
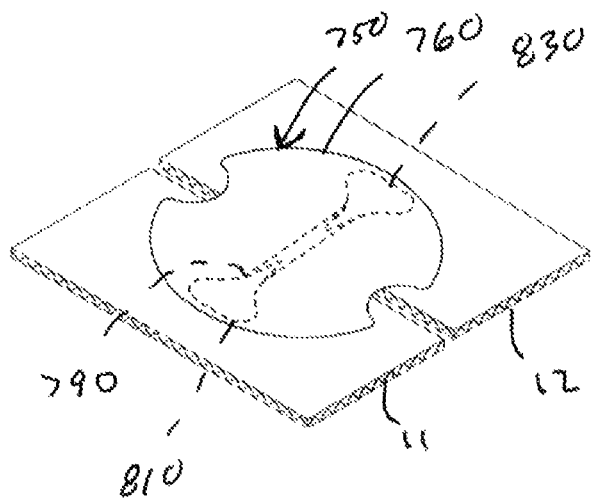
FIG. 64 is similar to FIG. 63 but shows the closure in the locked position.

The closure device is seen sequentially moving to the locked position in FIGS. 62-64. The glide is useful for both clockwise and counterclockwise twisting of the device 750, and is effective if the flaps are bent, damaged or even slightly thicker than the space 840 between the first piece 760 and second piece 790 at the second piece distal ends 795 and 796.

The device 750 locks the flaps 11 and 12 in the closed position when the flaps 11 and 12 are between the top piece 760 and bottom piece 790. It is appreciated that the engagement portions 770 and 775 can lie on an engagement axis, and that the engagement axis can be perpendicular to a second piece longitudinal axis. It is appreciated that other axis relationships could be used without departing from the broad aspects of the present invention. However, with the preferred arrangement, a user is certain that the flaps 11 and 12 are locked when the first piece 760 is flush against the flaps 11 and 12, and the engagement portions 770 and 775 are aligned with the gap 13. It is appreciated that the lock status is observable even though the second piece is not directly observable by the user when inserted between the flaps 11 and 12.

It is appreciated that the closure device 750 is illustrated twisting in a first direction relative to the box 5 to lock the box flaps 11 and 12. Yet, it is understood that the closure device could be twisted in the opposite direction to lock the box in the closed position as well without departing from the broad aspects of the present invention.

Thus, it is apparent that there has been provided, in accordance with the invention, a box closure device that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A closure device for a box with a first flap and a second flap, the first flap and the second flap having a gap therebetween when in a closed position, said closure device comprising:

a first piece;

a hub; and a second piece having a first section with a first section end and a second section with a second section end, said second piece having a center and being separated from said first piece at said hub located at said center, said second piece having a first lobe at said first section end and a second lobe at second section end, said first lobe having a top face with a top face center, said top face being crowned at said top face center, wherein said first section has a first section top that is linearly oriented and pitched, whereby said first section top is farther from said first piece at said hub and closer to said first piece at said first section end, and wherein said closure device is twistable to lock the first flap and the second flap in the closed position between said first piece and said second piece.

2. The closure device of claim 1, wherein:
said first lobe and said second lobe are symmetrical with each other.

3. The closure device of claim 1 wherein said first section comprises a round member at a location adjacent to where said second section and said hub are connected to each other.

4. The closure device of claim 1 wherein said first lobe is symmetrical about a second piece longitudinal axis.

5. The closure device of claim 1 wherein said first lobe has a lower face that is flat.

6. The closure device of claim 5 wherein said lower face is angled whereby said first lobe is thinnest at said first section end.

7. The closure device of claim 1 wherein:
said first piece has a first engagement portion and a second engagement portion; and
said first engagement portion is between said first lobe and said second lobe and said second engagement portion is opposite said first engagement portion about a first piece perimeter.

8. A closure device for a box with a first flap and a second flap, the first flap and the second flap having a gap therebetween when in a closed position, said closure device comprising:
a first piece; and
a second piece separated from said first piece with a hub, said second piece having a first section on a first side of said hub and a second section on a second side of said hub, said first section having a first section height that is taller adjacent to said hub and shorter at a first section end, and said second section having a second section height that is taller adjacent to said hub and shorter at a second section end,
wherein said closure device is twistable to lock the first flap and the second flap in the closed position between said first piece and said second piece.

9. The closure device of claim 8 wherein said first section comprises a member at a location adjacent to where said second section and said hub are connected to each other.

10. The closure device of claim 8 wherein:
said first section has a first lobe at said first section end; and
said second section has a second lobe at said second section end.

11. The closure device of claim 10 wherein said first lobe has a top face with a center, said top face being crowned at said center.

12. The closure device of claim 11 wherein said first section has a first section top that is linearly oriented.

13. The closure device of claim 10 wherein said first lobe has a lower face, said lower face being a flat face that is angled whereby said first lobe is thinnest at said first section end.

14. A closure device for a box with a first flap and a second flap, the first flap and the second flap having a gap therebetween when in a closed position, said closure device comprising:
a first piece;
a hub;
a second piece separated from said first piece via said hub, said second piece having:
a first section on a first side of said hub, said first section having a first lobe at a first section end, said first lobe having a crowned top face, said first section having a first section height that is taller adjacent to said hub and shorter at said first section end; and
a second section on a second side of said hub, said second section having a second lobe at a second section end, said second lobe having a crowned top face, said second section having a second section height that is taller adjacent to said hub and shorter at said second section end,
wherein said closure device is twistable to lock the first flap and the second flap in the closed position between said first piece and said second piece.

* * * * *